US012440855B2

(12) United States Patent
McAfee

(10) Patent No.: US 12,440,855 B2
(45) Date of Patent: *Oct. 14, 2025

(54) MULTI-MODE ROTOR SPRINKLER APPARATUS AND METHOD

(71) Applicant: Rain Bird Corporation, Azusa, CA (US)

(72) Inventor: Michael A. McAfee, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 17/975,345

(22) Filed: Oct. 27, 2022

(65) Prior Publication Data

US 2024/0139761 A1 May 2, 2024

(51) Int. Cl.
*B05B 3/02* (2006.01)
*B05B 3/04* (2006.01)

(52) U.S. Cl.
CPC ............ *B05B 3/021* (2013.01); *B05B 3/0436* (2013.01)

(58) Field of Classification Search
CPC ..... B05B 3/021; B05B 3/0436; B05B 3/0454; B05B 3/026; B05B 17/04; B05B 3/0431; B05B 15/74
See application file for complete search history.

(56) References Cited

U.S. PATENT DOCUMENTS 2,187,549 A 1/1940 Thompson
2,268,855 A 1/1942 Brooks
2,625,411 A 1/1953 Unger
(Continued)

FOREIGN PATENT DOCUMENTS

EP 1818104 A1 8/2007
EP 1864717 12/2007
(Continued)

OTHER PUBLICATIONS

USPTO; U.S. Appl. No. 17/724,993; Notice of Allowance and Fees Due (PTOL-85) mailed Jun. 16, 2025; (pp. 1-8).
Machine Translation of EP-1864717-A2 Description, Oct. 2024, Espacenet, pp. 1-9 (Year: 2024).
(Continued)

*Primary Examiner* — Steven M Cernoch

(74) *Attorney, Agent, or Firm* — Fitch, Even, Tabin & Flannery, LLP

(57) ABSTRACT

A multi-mode sprinkler adjustable for part or full circle operation to irrigate a selected area is provided. The sprinkler includes a nozzle for dispensing fluid, a set of gears for rotating the nozzle, and an arc setting mechanism that cooperates with the set of gears. The arc setting mechanism comprises a fixed trip for switching to a first direction for the nozzle and an adjustable trip movable relative to the fixed trip for setting an arc of rotation for the nozzle in the part circle mode. The arc setting mechanism also includes a toggle for engaging the fixed trip and the adjustable trip to switch between a first direction and a second direction when in the part circle mode. In the full circle mode, the adjustable trip is deflected radially outward, and the fixed trip deflects radially outward as it passes the toggle, allowing continuous rotation of the nozzle. A memory arc function is also provided, in which the arc setting mechanism returns to an originally set arc of rotation after mishandling of the sprinkler.

22 Claims, 23 Drawing Sheets

(56) References Cited

U.S. PATENT DOCUMENTS

| | | | |
|---|---|---|---|
| 2,721,052 | A | 10/1955 | Hull |
| 2,950,132 | A | 8/1960 | Kocsuta |
| 2,999,701 | A | 9/1961 | Blair |
| 3,091,399 | A | 5/1963 | Kennedy |
| 3,095,148 | A | 6/1963 | Smith |
| 3,107,056 | A | 10/1963 | Hunter |
| 3,135,259 | A | 6/1964 | Evans |
| 3,204,988 | A | 9/1965 | Dunton |
| 3,244,373 | A | 4/1966 | Hait |
| 3,263,930 | A | 8/1966 | Friedmann |
| 3,334,817 | A | 8/1967 | Miller |
| 3,521,822 | A | 7/1970 | Friedmann |
| 3,523,647 | A | 8/1970 | Radecki |
| 3,645,451 | A | 2/1972 | Hauser |
| 3,655,132 | A | 4/1972 | Rosic |
| 3,782,638 | A | 1/1974 | Bumpstead |
| 3,921,912 | A | 11/1975 | Hayes |
| 3,934,820 | A | 1/1976 | Phaup |
| 4,059,227 | A | 11/1977 | Hunter |
| 4,091,997 | A | 5/1978 | Ridgway |
| 4,119,275 | A | 10/1978 | Hunter |
| 4,149,358 | A | 4/1979 | Comer |
| 4,198,000 | A | 4/1980 | Hunter |
| 4,204,642 | A | 5/1980 | Hunter |
| 4,220,283 | A | 9/1980 | Citron |
| 4,265,404 | A | 5/1981 | Hunter |
| 4,272,024 | A | 6/1981 | Kah |
| 4,301,967 | A | 11/1981 | Hunter |
| 4,398,666 | A | 8/1983 | Hunter |
| 4,406,440 | A | 9/1983 | Kulle |
| 4,417,691 | A | 11/1983 | Lockwood |
| 4,451,635 | A | 5/1984 | Gould |
| 4,471,908 | A | 9/1984 | Hunter |
| 4,498,626 | A | 2/1985 | Pitchford |
| 4,501,391 | A | 2/1985 | Hunter |
| 4,559,653 | A | 12/1985 | Mathews |
| 4,569,485 | A | 2/1986 | Walto |
| 4,624,412 | A | 11/1986 | Hunter |
| 4,625,914 | A | 12/1986 | Sexton |
| 4,634,052 | A | 1/1987 | Grizzle |
| 4,635,975 | A | 1/1987 | Campbell |
| 4,637,636 | A | 1/1987 | Guest |
| 4,650,118 | A | 3/1987 | Saarem |
| 4,681,259 | A | 7/1987 | Troup |
| 4,682,755 | A | 7/1987 | Bernstein |
| 4,702,417 | A | 10/1987 | Hartley |
| 4,708,290 | A | 11/1987 | Osmond |
| 4,708,291 | A | 11/1987 | Grundy |
| 4,718,605 | A | 1/1988 | Hunter |
| 4,732,861 | A | 3/1988 | Sinclair |
| 4,773,595 | A | 9/1988 | Livne |
| 4,784,325 | A | 11/1988 | Walker |
| 4,787,558 | A | 11/1988 | Sexton |
| 4,819,875 | A | 4/1989 | Beal |
| 4,867,378 | A | 9/1989 | Kah |
| 4,867,379 | A | 9/1989 | Hunter |
| 4,892,252 | A | 1/1990 | Bruninga |
| 4,898,332 | A | 2/1990 | Hunter |
| 4,901,924 | A | 2/1990 | Kah |
| 4,919,337 | A | 4/1990 | Van Leeuwen |
| 4,925,098 | A | 5/1990 | Di Paola |
| 4,955,542 | A | 9/1990 | Kah |
| 4,961,534 | A | 10/1990 | Tyler |
| 4,967,961 | A | 11/1990 | Hunter |
| 4,971,256 | A | 11/1990 | Malcolm |
| 4,972,993 | A | 11/1990 | Van Leeuwen |
| 5,009,368 | A | 4/1991 | Streck |
| 5,031,833 | A | 7/1991 | Alkalay |
| 5,031,840 | A | 7/1991 | Grundy |
| 5,048,757 | A | 9/1991 | Van Leeuwen |
| 5,050,800 | A | 9/1991 | Lamar |
| 5,052,621 | A | 10/1991 | Katzer |
| 5,097,861 | A | 3/1992 | Hopkins |
| 5,098,021 | A | 3/1992 | Kah |
| 5,115,977 | A | 5/1992 | Alkalay |
| 5,148,990 | A | 9/1992 | Kah |
| 5,148,991 | A | 9/1992 | Kah |
| 5,158,232 | A | 10/1992 | Tyler |
| 5,174,501 | A | 12/1992 | Hadar |
| 5,226,602 | A | 7/1993 | Cochran |
| 5,239,587 | A | 8/1993 | Muckelrath |
| 5,251,938 | A | 10/1993 | Erickson |
| 5,259,587 | A | 11/1993 | D'Alessio |
| 5,288,023 | A | 2/1994 | Han |
| 5,291,842 | A | 3/1994 | Sallstrom |
| 5,330,103 | A | 7/1994 | Eckstein |
| 5,360,167 | A | 11/1994 | Grundy |
| 5,375,768 | A | 12/1994 | Clark |
| 5,383,600 | A | 1/1995 | Verbera |
| 5,385,600 | A | 1/1995 | Jounela |
| 5,394,678 | A | 3/1995 | Lonn |
| 5,417,370 | A | 5/1995 | Kah |
| 5,444,611 | A | 8/1995 | Woytowitz |
| RE35,037 | E | 9/1995 | Kah |
| 5,456,411 | A | 10/1995 | Scott |
| 5,462,251 | A | 10/1995 | Kawabe |
| 5,473,961 | A | 12/1995 | Jackson |
| 5,487,572 | A | 1/1996 | Combot-Courrau |
| 5,526,982 | A | 6/1996 | McKenzie |
| 5,527,073 | A | 6/1996 | Readman |
| 5,556,036 | A | 9/1996 | Chase |
| 5,588,594 | A | 12/1996 | Kah |
| 5,611,488 | A | 3/1997 | Frolich |
| 5,630,551 | A | 5/1997 | Forcier |
| 5,641,122 | A | 6/1997 | Alkalai |
| 5,653,390 | A | 8/1997 | Kah |
| 5,673,855 | A | 10/1997 | Nguyen |
| 5,676,315 | A | 10/1997 | Han |
| 5,681,062 | A | 10/1997 | Fukao |
| 5,685,486 | A | 11/1997 | Spenser |
| D388,502 | S | 12/1997 | Kah |
| 5,695,122 | A | 12/1997 | Messinger |
| 5,695,123 | A | 12/1997 | Le |
| 5,695,224 | A | 12/1997 | Grenier |
| 5,699,962 | A | 12/1997 | Scott |
| 5,709,417 | A | 1/1998 | Verbeck |
| 5,722,593 | A | 3/1998 | McKenzie |
| 5,758,827 | A | 6/1998 | Van Le |
| 5,762,270 | A | 6/1998 | Kearby |
| 5,765,757 | A | 6/1998 | Bendall |
| 5,816,627 | A | 10/1998 | Readman |
| 5,823,440 | A | 10/1998 | Clark |
| 5,826,797 | A | 10/1998 | Kah |
| 5,868,316 | A | 2/1999 | Scott |
| 5,899,386 | A | 5/1999 | Miyasato |
| 5,911,443 | A | 6/1999 | Le Quere |
| 5,938,122 | A | 8/1999 | Heren |
| 5,975,430 | A | 11/1999 | Larsen |
| 5,992,760 | A | 11/1999 | Kearby |
| 6,000,632 | A | 12/1999 | Wallace |
| 6,029,907 | A | 2/2000 | McKenzie |
| 6,039,268 | A | 3/2000 | Grundy |
| 6,042,021 | A | 3/2000 | Clark |
| 6,050,502 | A | 4/2000 | Clark |
| 6,085,995 | A | 7/2000 | Kah |
| 6,109,545 | A | 8/2000 | Kah |
| 6,109,664 | A | 8/2000 | Guest |
| 6,138,924 | A | 10/2000 | Hunter |
| 6,155,493 | A | 12/2000 | Kearby |
| 6,168,577 | B1 | 1/2001 | Niederjohn |
| 6,182,909 | B1 | 2/2001 | Kah |
| 6,209,801 | B1 | 4/2001 | Kearby |
| 6,227,455 | B1 | 5/2001 | Scott |
| 6,231,090 | B1 | 5/2001 | Fukao |
| 6,237,862 | B1 | 5/2001 | Kah |
| 6,241,158 | B1 | 6/2001 | Clark |
| 6,244,521 | B1 | 6/2001 | Sesser |
| 6,293,147 | B1 | 9/2001 | Parker |
| 6,336,597 | B1 | 1/2002 | Kah |
| 6,351,929 | B1 | 3/2002 | Gust |
| 6,364,217 | B1 | 4/2002 | Lockwood |
| D458,554 | S | 6/2002 | Jolly |
| 6,464,151 | B1 | 10/2002 | Cordua |
| 6,478,237 | B2 | 11/2002 | Kearby |

(56) References Cited

U.S. PATENT DOCUMENTS

| | | | |
|---|---|---|---|
| 6,488,401 | B1 | 12/2002 | Seaman |
| 6,491,235 | B1 | 12/2002 | Scott |
| 6,494,384 | B1 | 12/2002 | Meyer |
| 6,499,672 | B1 | 12/2002 | Sesser |
| 6,568,608 | B2 | 5/2003 | Sirkin |
| 6,601,781 | B2 | 8/2003 | Kah |
| 6,607,147 | B2 | 8/2003 | Schneider |
| 6,612,623 | B2 | 9/2003 | Salomon-Bahls |
| 6,637,672 | B2 | 10/2003 | Cordua |
| 6,651,905 | B2 | 11/2003 | Sesser |
| 6,655,830 | B1 | 12/2003 | Seaman |
| 6,663,145 | B1 | 12/2003 | Lyall |
| 6,695,223 | B2 | 2/2004 | Beutler |
| 6,712,796 | B2 | 3/2004 | Fentis |
| 6,721,630 | B1 | 4/2004 | Woytowitz |
| 6,722,629 | B1 | 4/2004 | Nakazawa |
| 6,732,950 | B2 | 5/2004 | Ingham, Jr. |
| 6,732,952 | B2 | 5/2004 | Kah |
| 6,736,332 | B2 | 5/2004 | Sesser |
| 6,799,732 | B2 | 10/2004 | Sirkin |
| 6,802,458 | B2 | 10/2004 | Gregory |
| 6,814,305 | B2 | 11/2004 | Townsend |
| 6,817,543 | B2 | 11/2004 | Clark |
| 6,824,172 | B1 | 11/2004 | Komolrochanaporn |
| 6,827,291 | B2 | 12/2004 | Townsend |
| 6,834,816 | B2 | 12/2004 | Kah, Jr. |
| 6,840,460 | B2 | 1/2005 | Clark |
| 6,842,667 | B2 | 1/2005 | Beutler |
| 6,848,124 | B2 | 2/2005 | Goettl |
| 6,848,632 | B2 | 2/2005 | Clark |
| 6,854,664 | B2 | 2/2005 | Smith |
| 6,869,026 | B2 | 3/2005 | McKenzie |
| 6,871,795 | B2 | 3/2005 | Anuskiewicz |
| 6,883,727 | B2 | 4/2005 | De Los Santos |
| 6,896,881 | B1 | 5/2005 | Russell |
| 6,899,355 | B2 | 5/2005 | Klein |
| 6,913,292 | B2 | 7/2005 | Snyder, Sr. |
| 6,921,029 | B2 | 7/2005 | Lockwood |
| 6,929,236 | B1 | 8/2005 | Height |
| 6,942,164 | B2 | 9/2005 | Walker |
| 6,945,471 | B2 | 9/2005 | McKenzie |
| 6,957,782 | B2 | 10/2005 | Clark |
| 6,988,747 | B2 | 1/2006 | Allen |
| 6,991,362 | B1 | 1/2006 | Seaman |
| 7,010,394 | B1 | 3/2006 | Runge |
| 7,017,831 | B2 | 3/2006 | Santiago |
| 7,028,920 | B2 | 4/2006 | Hekman |
| 7,032,836 | B2 | 4/2006 | Sesser |
| 7,032,844 | B2 | 4/2006 | Cordua |
| 7,040,553 | B2 | 5/2006 | Clark |
| 7,044,403 | B2 | 5/2006 | Kah |
| 7,090,146 | B1 | 8/2006 | Ericksen |
| 7,111,875 | B2 | 9/2006 | Ball |
| 7,121,593 | B2 | 10/2006 | Snyder, Sr. |
| 7,133,749 | B2 | 11/2006 | Goldberg |
| 7,134,613 | B2 | 11/2006 | Kah |
| 7,143,692 | B2 | 12/2006 | Schmitt |
| 7,143,962 | B2 | 12/2006 | Kah, Jr. |
| 7,152,814 | B1 | 12/2006 | Schapper |
| 7,159,795 | B2 | 1/2007 | Sesser |
| 7,168,632 | B2 | 1/2007 | Kates |
| 7,191,958 | B1 | 3/2007 | Wang |
| 7,195,287 | B2 | 3/2007 | Wai |
| 7,225,057 | B2 | 5/2007 | Froman |
| 7,226,003 | B2 | 6/2007 | Kah |
| 7,232,078 | B2 | 6/2007 | Kah, Jr. |
| 7,232,081 | B2 | 6/2007 | Kah |
| 7,234,651 | B2 | 6/2007 | Mousavi |
| 7,255,291 | B1 | 8/2007 | Lo |
| 7,287,711 | B2 | 10/2007 | Crooks |
| 7,287,712 | B2 | 10/2007 | Kah |
| 7,322,533 | B2 | 1/2008 | Grizzle |
| 7,325,753 | B2 | 2/2008 | Gregory |
| 7,337,988 | B2 | 3/2008 | McCormick |
| 7,363,113 | B2 | 4/2008 | Runge |
| RE40,440 | E | 7/2008 | Sesser |
| 7,392,936 | B1 | 7/2008 | Green |
| 7,392,956 | B2 | 7/2008 | McKenzie |
| 7,404,525 | B2 | 7/2008 | Santiago |
| 7,412,303 | B1 | 8/2008 | Porter |
| 7,422,162 | B2 | 9/2008 | Wang |
| 7,422,752 | B2 | 9/2008 | Hirst |
| 7,429,005 | B2 | 9/2008 | Schapper |
| 7,472,840 | B2 | 1/2009 | Gregory |
| 7,478,526 | B2 | 1/2009 | McAfee |
| 7,500,619 | B2 | 3/2009 | Lockwood |
| 7,500,620 | B2 | 3/2009 | Cordua |
| 7,500,699 | B2 | 3/2009 | Snyder, Sr. |
| 7,530,606 | B1 | 5/2009 | Yang |
| 7,552,632 | B2 | 6/2009 | Runge |
| 7,574,284 | B2 | 8/2009 | Goldberg |
| 7,578,010 | B2 | 8/2009 | Goettl |
| 7,581,687 | B2 | 9/2009 | Feith |
| 7,584,023 | B1 | 9/2009 | Palmer |
| 7,590,471 | B2 | 9/2009 | Jacobsen |
| 7,597,273 | B2 | 10/2009 | McAfee |
| 7,611,077 | B2 | 11/2009 | Sesser |
| 7,621,464 | B2 | 11/2009 | Smith |
| 7,621,467 | B1 | 11/2009 | Garcia |
| 7,624,934 | B2 | 12/2009 | Breedlove |
| 7,629,590 | B2 | 12/2009 | Horsky |
| 7,644,870 | B2 | 1/2010 | Alexander |
| 7,677,469 | B1 | 3/2010 | Clark |
| 7,686,236 | B2 | 3/2010 | Alexander |
| 7,703,706 | B2 | 4/2010 | Walker |
| 7,717,475 | B2 | 5/2010 | Savelle |
| 7,748,646 | B2 | 7/2010 | Clark |
| 7,761,189 | B2 | 7/2010 | Froman |
| 7,766,259 | B2 | 8/2010 | Feith |
| 7,766,396 | B1 | 8/2010 | Elbaz |
| 7,793,868 | B2 | 9/2010 | Kah |
| 7,820,981 | B2 | 10/2010 | Horsky |
| 7,823,804 | B2 | 11/2010 | Cordua |
| 7,828,229 | B2 | 11/2010 | Kah |
| 7,828,230 | B1 | 11/2010 | Anuskiewicz |
| 7,834,816 | B2 | 11/2010 | Marino |
| 7,841,547 | B2 | 11/2010 | Kah |
| 7,850,094 | B2 | 12/2010 | Richmond |
| 7,853,363 | B1 | 12/2010 | Porter |
| 7,861,948 | B1 | 1/2011 | Crooks |
| 7,862,089 | B2 | 1/2011 | Crompton |
| 7,877,168 | B1 | 1/2011 | Porter |
| 7,912,588 | B2 | 3/2011 | Runge |
| 7,917,249 | B2 | 3/2011 | Jacobsen |
| 7,942,161 | B2 | 5/2011 | Crompton |
| 7,962,245 | B2 | 6/2011 | Runge |
| RE42,596 | E | 8/2011 | Sesser |
| 7,988,071 | B2 | 8/2011 | Bredberg |
| 8,006,919 | B2 | 8/2011 | Renquist |
| 8,020,788 | B2 | 9/2011 | Luettgen |
| 8,025,315 | B2 | 9/2011 | Schreckenberg |
| 8,033,578 | B2 | 10/2011 | De Wilde |
| 8,047,456 | B2 | 11/2011 | Kah |
| 8,074,456 | B2 | 12/2011 | Shah |
| 8,074,897 | B2 | 12/2011 | Hunnicutt |
| 8,113,443 | B2 | 2/2012 | Zur |
| 8,136,742 | B2 | 3/2012 | Cordua |
| 8,136,743 | B2 | 3/2012 | Kah |
| 8,205,915 | B1 | 6/2012 | Crompton |
| 8,272,578 | B1 | 9/2012 | Clark |
| 8,297,533 | B2 | 10/2012 | Dunn |
| 8,313,043 | B1 | 11/2012 | Crooks |
| 8,469,288 | B1 | 6/2013 | Clark |
| 8,474,733 | B1 | 7/2013 | Clark |
| 8,628,027 | B2 | 1/2014 | Kah |
| 8,636,229 | B1 | 1/2014 | Clark |
| 8,636,230 | B1 | 1/2014 | Clark |
| 8,636,233 | B2 | 1/2014 | Clark |
| 8,727,238 | B1 | 5/2014 | Clark |
| 8,777,124 | B2 | 7/2014 | Clark |
| 8,939,384 | B1 | 1/2015 | Anuskiewicz |
| 8,955,767 | B1 | 2/2015 | Clark |
| 8,955,768 | B1 | 2/2015 | Clark |
| 8,991,725 | B2 | 3/2015 | Kah |

(56) References Cited

U.S. PATENT DOCUMENTS

| | | | |
|---|---|---|---|
| 8,991,726 | B2 | 3/2015 | Kah, Jr. |
| 8,991,730 | B2 | 3/2015 | Kah, Jr. |
| 9,120,111 | B2 | 9/2015 | Nations |
| 9,156,043 | B2 | 10/2015 | Walker |
| 9,162,239 | B2 | 10/2015 | Renner |
| 9,205,435 | B1 | 12/2015 | Clark |
| 9,446,421 | B1 | 9/2016 | Anuskiewicz |
| 9,511,387 | B2 | 12/2016 | Keren |
| 9,616,437 | B2 | 4/2017 | Onofrio |
| 10,029,265 | B2 | 7/2018 | Bell |
| 10,099,231 | B2 | 10/2018 | Clark |
| 10,464,083 | B2 | 11/2019 | Onofrio |
| 10,717,093 | B2 | 7/2020 | Bell |
| 10,786,823 | B2 | 9/2020 | Clark |
| 11,040,359 | B2 | 6/2021 | Simmons |
| 11,090,671 | B2 | 8/2021 | Zimmerman |
| 11,684,939 | B2 | 6/2023 | Wright, III |
| 11,779,948 | B2 | 10/2023 | Renquist |
| 12,036,569 | B2 | 7/2024 | Zimmerman |
| 12,343,748 | B2 * | 7/2025 | McAfee ................ B05B 3/0454 |
| 2001/0013557 | A1 | 8/2001 | Kah |
| 2002/0023972 | A1 | 2/2002 | Kah |
| 2002/0074432 | A1 | 6/2002 | Kah |
| 2002/0089175 | A1 | 7/2002 | Ericksen |
| 2002/0130202 | A1 | 9/2002 | Kah |
| 2002/0135184 | A1 | 9/2002 | Snyder |
| 2002/0158145 | A1 | 10/2002 | Schneider |
| 2003/0006306 | A1 | 1/2003 | Clark |
| 2003/0006307 | A1 | 1/2003 | Clark |
| 2003/0010842 | A1 | 1/2003 | Kah |
| 2003/0075620 | A1 | 4/2003 | Kah, Jr. |
| 2003/0089796 | A1 | 5/2003 | Kah |
| 2003/0124704 | A1 | 7/2003 | Strittmatter |
| 2003/0155433 | A1 | 8/2003 | Gregory |
| 2004/0014053 | A1 | 1/2004 | Zerhusen |
| 2004/0050958 | A1 | 3/2004 | McKenzie |
| 2004/0108392 | A1 | 6/2004 | Kah |
| 2004/0164178 | A1 | 8/2004 | Kah |
| 2004/0195358 | A1 | 10/2004 | Santiago |
| 2004/0195400 | A1 | 10/2004 | Anuskiewicz |
| 2004/0239115 | A1 | 12/2004 | Wilk |
| 2004/0241703 | A1 | 12/2004 | DeSauvage |
| 2005/0009105 | A1 | 1/2005 | Goddard |
| 2005/0042216 | A1 | 2/2005 | Frantz |
| 2005/0054576 | A1 | 3/2005 | Siler-Khodr |
| 2005/0103887 | A1 | 5/2005 | McCormick |
| 2005/0103901 | A1 | 5/2005 | Kah |
| 2005/0133619 | A1 | 6/2005 | Clark |
| 2005/0146133 | A1 | 7/2005 | Snyder |
| 2005/0161534 | A1 | 7/2005 | Kah |
| 2005/0173557 | A1 | 8/2005 | Kah |
| 2005/0194461 | A1 | 9/2005 | Goldberg |
| 2005/0194464 | A1 | 9/2005 | Bruninga |
| 2005/0214218 | A1 | 9/2005 | Russell |
| 2005/0233448 | A1 | 10/2005 | Oh |
| 2006/0049275 | A1 | 3/2006 | Santiago |
| 2006/0184284 | A1 | 8/2006 | Froman |
| 2006/0219815 | A1 | 10/2006 | Hekman |
| 2006/0265852 | A1 | 11/2006 | Snyder |
| 2006/0273196 | A1 | 12/2006 | Crooks |
| 2006/0278727 | A1 | 12/2006 | Kah |
| 2007/0034712 | A1 | 2/2007 | Kah |
| 2007/0075542 | A1 | 4/2007 | Glaze |
| 2007/0119975 | A1 | 5/2007 | Hunnicutt |
| 2007/0119976 | A1 | 5/2007 | Kah |
| 2007/0119978 | A1 | 5/2007 | Wang |
| 2007/0128315 | A1 | 6/2007 | Szydlowski |
| 2007/0131802 | A1 | 6/2007 | Kah |
| 2007/0235565 | A1 | 10/2007 | Kah |
| 2008/0034859 | A1 | 2/2008 | Runge |
| 2008/0054092 | A1 | 3/2008 | Alexander |
| 2008/0087743 | A1 | 4/2008 | Govrin |
| 2008/0128531 | A1 | 6/2008 | Kah |
| 2008/0142618 | A1 | 6/2008 | Smith |
| 2008/0257982 | A1 | 10/2008 | Kah |
| 2008/0308650 | A1 | 12/2008 | Clark |
| 2009/0053226 | A1 | 2/2009 | Crowley |
| 2009/0065606 | A1 | 3/2009 | Lee |
| 2009/0072048 | A1 | 3/2009 | Renquist |
| 2009/0130315 | A1 | 5/2009 | Vogel |
| 2009/0173803 | A1 | 7/2009 | Kah |
| 2009/0173804 | A1 | 7/2009 | Kah |
| 2009/0177330 | A1 | 7/2009 | Kah |
| 2009/0188988 | A1 | 7/2009 | Walker |
| 2009/0278556 | A1 | 11/2009 | Man |
| 2010/0029053 | A1 | 2/2010 | Itokawa |
| 2010/0090024 | A1 | 4/2010 | Hunnicutt |
| 2010/0098632 | A1 | 4/2010 | Russell |
| 2010/0105865 | A1 | 4/2010 | Telford |
| 2010/0108787 | A1 | 5/2010 | Walker |
| 2010/0176217 | A1 | 7/2010 | Richmond |
| 2010/0179310 | A1 | 7/2010 | Kamme |
| 2010/0187331 | A1 | 7/2010 | Clark |
| 2010/0236936 | A1 | 9/2010 | Brunner |
| 2010/0243762 | A1 | 9/2010 | Onofrio |
| 2010/0244438 | A1 | 9/2010 | Johanson |
| 2010/0276512 | A1 | 11/2010 | Nies |
| 2010/0301135 | A1 | 12/2010 | Hunnicutt |
| 2010/0301142 | A1 | 12/2010 | Hunnicutt |
| 2010/0327083 | A1 | 12/2010 | Kah |
| 2011/0017842 | A1 | 1/2011 | Nations |
| 2011/0036933 | A1 | 2/2011 | Kah |
| 2011/0036993 | A1 | 2/2011 | Mano |
| 2011/0043607 | A1 | 2/2011 | Grier |
| 2011/0045005 | A1 | 2/2011 | Crowley |
| 2011/0049875 | A1 | 3/2011 | Stults |
| 2011/0057048 | A1 | 3/2011 | Mcafee |
| 2011/0084151 | A1 | 4/2011 | Dunn |
| 2011/0095521 | A1 | 4/2011 | Crompton |
| 2011/0108637 | A1 | 5/2011 | Kah |
| 2011/0114569 | A1 | 5/2011 | Kim |
| 2011/0121092 | A1 | 5/2011 | Scully |
| 2011/0121097 | A1 | 5/2011 | Walker |
| 2011/0238228 | A1 | 9/2011 | Woytowitz |
| 2011/0239310 | A1 | 9/2011 | Cheng |
| 2011/0248094 | A1 | 10/2011 | Robertson |
| 2011/0248097 | A1 | 10/2011 | Kim |
| 2011/0306169 | A1 | 12/2011 | Ye |
| 2011/0309161 | A1 | 12/2011 | Renquist |
| 2011/0309169 | A1 | 12/2011 | Kah |
| 2012/0012670 | A1 | 1/2012 | Kah |
| 2012/0041606 | A1 | 2/2012 | Standerfer |
| 2012/0043398 | A1 | 2/2012 | Clark |
| 2012/0061489 | A1 | 3/2012 | Hunnicutt |
| 2012/0085840 | A1 | 4/2012 | Marino |
| 2012/0118998 | A1 | 5/2012 | Drechsel |
| 2012/0138832 | A1 | 6/2012 | Townsend |
| 2012/0234940 | A1 | 9/2012 | Clark |
| 2013/0015273 | A1 | 1/2013 | Onofrio |
| 2013/0221128 | A1 | 8/2013 | Nations |
| 2014/0014738 | A1 | 1/2014 | Walker |
| 2014/0263735 | A1 | 9/2014 | Nations |
| 2019/0076858 | A1 | 3/2019 | Clark |
| 2021/0162449 | A1 | 6/2021 | Mcafee |
| 2021/0316325 | A1 | 10/2021 | Peleg |
| 2021/0346902 | A1 | 11/2021 | Zimmerman |
| 2022/0297140 | A1 | 9/2022 | Mcafee |
| 2023/0286003 | A1 | 9/2023 | Wright, III |

FOREIGN PATENT DOCUMENTS

| | | | |
|---|---|---|---|
| EP | 2206560 | A1 | 7/2010 |
| EP | 1492626 | B1 | 12/2011 |
| WO | 03086643 | A1 | 10/2003 |
| WO | 2004113777 | | 12/2004 |
| WO | 2009152980 | | 12/2009 |
| WO | 2011002928 | A1 | 1/2011 |
| WO | 2014011877 | | 1/2014 |

OTHER PUBLICATIONS

International Search Report, International Patent Application No. PCT/US2013/050072, dated Nov. 7, 2013, 2 pages.

(56) References Cited

OTHER PUBLICATIONS

U.S. Appl. No. 61/602,948, filed Feb. 24, 2012 and entitled Arc Adjustable Rotary Sprinkler Having Full-Circle Operation And Automatic Matched Precipitation.
U.S. Appl. No. 61/790,142, filed Mar. 15, 2013 and entitled Matched Precipitation Rate Rotary Sprinkler.
U.S. Appl. No. 63/161,843, filed Mar. 16, 2021 and entitled Multi-Mode Rotor Sprinkler Apparatus and Method.
USPTO; U.S. Appl. No. 13/776,044; Notice of Allowance mailed Apr. 23, 2015.
USPTO; U.S. Appl. No. 14/209,910; Office Action mailed Dec. 16, 2015.
USPTO; U.S. Appl. No. 17/694,948; Notice of Allowance and Fees Due (PTOL-85) mailed Apr. 28, 2025; (pp. 1-9).
USPTO; U.S. Appl. No. 17/694,948; Notice of Allowance and Fees Due (PTOL-85) mailed May 20, 2025; (pp. 1-9).
USPTO; U.S. Appl. No. 17/724,993; Non-Final Rejection mailed Apr. 14, 2025; (pp. 1-7).
USPTO; U.S. Appl. No. 17/694,948; Non-Final Rejection mailed Oct. 25, 2024; (pp. 1-14).

* cited by examiner

MULTI-MODE ROTOR SPRINKLER APPARATUS AND METHOD

TECHNICAL FIELD

The technical field relates to irrigation sprinklers and, more specifically, to apparatuses and methods for providing a multi-mode rotor-type sprinkler.

BACKGROUND

Sprinklers are commonly used for irrigating personal and commercial lawns, golf courses, athletic fields, and agricultural fields. Pop-up irrigation sprinklers are well known in the art, particularly for use in irrigation systems wherein it is necessary or desirable to embed the sprinkler in the ground so that it does not project appreciably above ground level when not in use. In a typical pop-up sprinkler, a tubular riser is mounted within a generally cylindrical upright sprinkler housing or case having an open upper end, with a spray head carrying one or more spray nozzles mounted at an upper end of the riser.

One type of pop-up sprinkler is a sprinkler having a rotary driven spray head mounted at the upper end of a pop-up riser, otherwise known as a rotor sprinkler. Rotor sprinklers generally include a rotating turret that sits on top of the riser. The turret includes at least one nozzle that discharges water from the rotating turret.

Rotor sprinklers commonly include two forms. One form is a rotor sprinkler where the turret rotates through a full circle or 360-degree arc of rotation. The other form is where the turret reciprocates back and forth in a part circle (e.g., 90 degrees). Part circle type rotor sprinklers typically have a reversing mechanism that allows for setting the watering pattern to a desired angle range.

One concern in landscape irrigation is minimizing water waste and loss. Many communities regulate the use of water for irrigation, and these regulations may limit the amount of water usage, among other restrictions. Part circle rotor sprinklers may be useful in providing watering of a limited area in view of the above concerns. In conventional models, part circle rotor sprinklers operate so that a direction of the water stream from the nozzle oscillates between end limits, avoiding watering of areas that do not need watering, such as sidewalks, driveways, parking lots and the like. On the other hand, while full circle rotor sprinklers may improve water distribution by providing a larger area of irrigation, some full circle rotor sprinklers are not true full circle rotor sprinklers. Instead, they traverse through almost 360 degrees reversing once for every passing. The point where the rotor sprinkler reverses over waters this area radially outward from the sprinkler. In addition, many irrigation terrains require a mixture of the two rotor types, part circle and full circle. This requires two products to be made available, two products to be inventoried, and two products to be installed where incorrect installation could occur. Thus, there is a desire for a single rotor sprinkler that can operate in part circle mode and true full circle mode.

Additionally, an arc setting mechanism for a rotor sprinkler designed to operate in part circle mode and true full circle mode may include components configured to engage and put stress on one another during use. In some configurations, this can weaken or break the components over continued use and shorten the life of the product. Thus, there is additionally a desire for the rotor sprinkler to have a robust arc setting mechanism that can withstand use over time.

Further, in certain circumstances, the set angle of rotation for a rotor sprinkler that can operate in part circle mode and true full circle mode may sometimes be thrown off course. This may occur, for example, if an unauthorized user (i.e., a vandal) mishandles the turret or rotor housing and forces the components of the arc setting mechanism into an unintended configuration, such as beyond a stop. Alternatively, an authorized user may inadvertently force the arc setting mechanism into such an unintended configuration. This mishandling can have deleterious consequences if it is not noticed promptly, as the intended target terrain area will not be irrigated. Thus, there is a further desire for an arc setting mechanism that can protect against such mishandling, specifically one that is configured to automatically return to the original desired angle of rotation.

DETAILED DESCRIPTION

Figure 1:
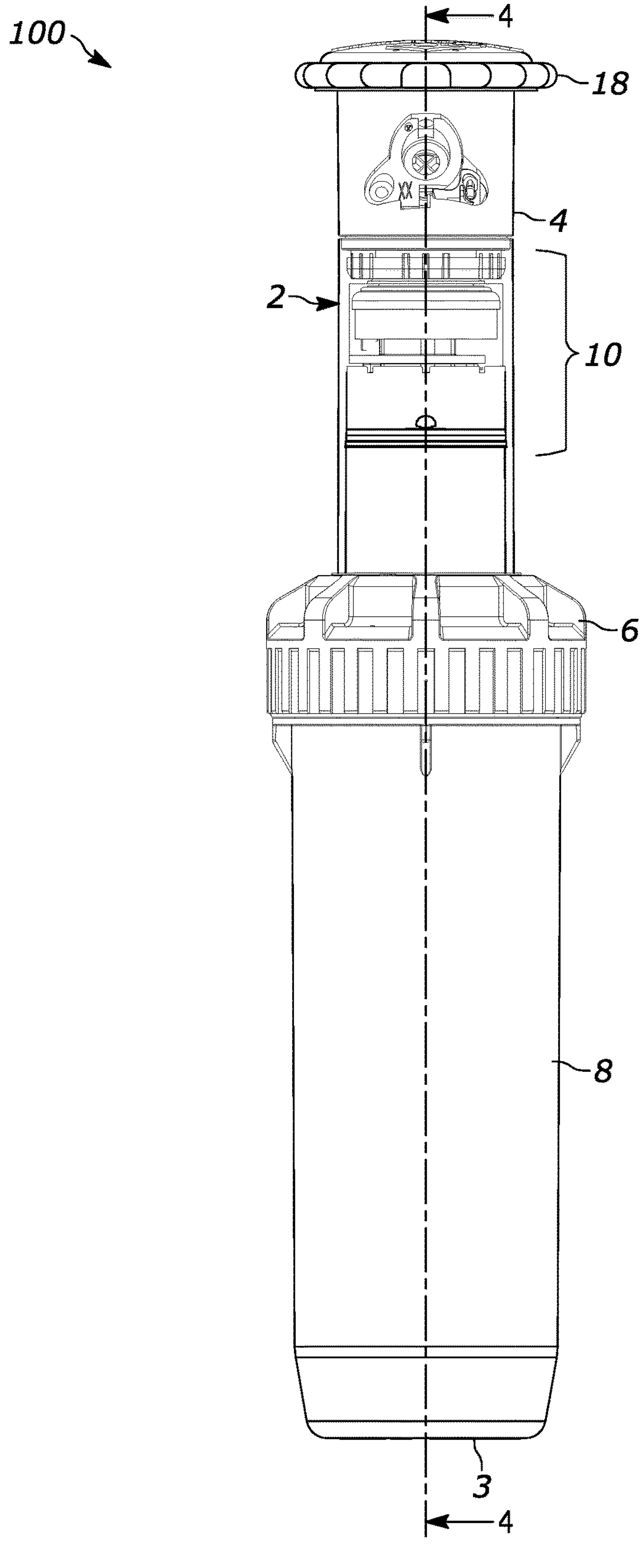
FIG. 1 is an elevational view of a rotor sprinkler according to some embodiments.
Figure 2:
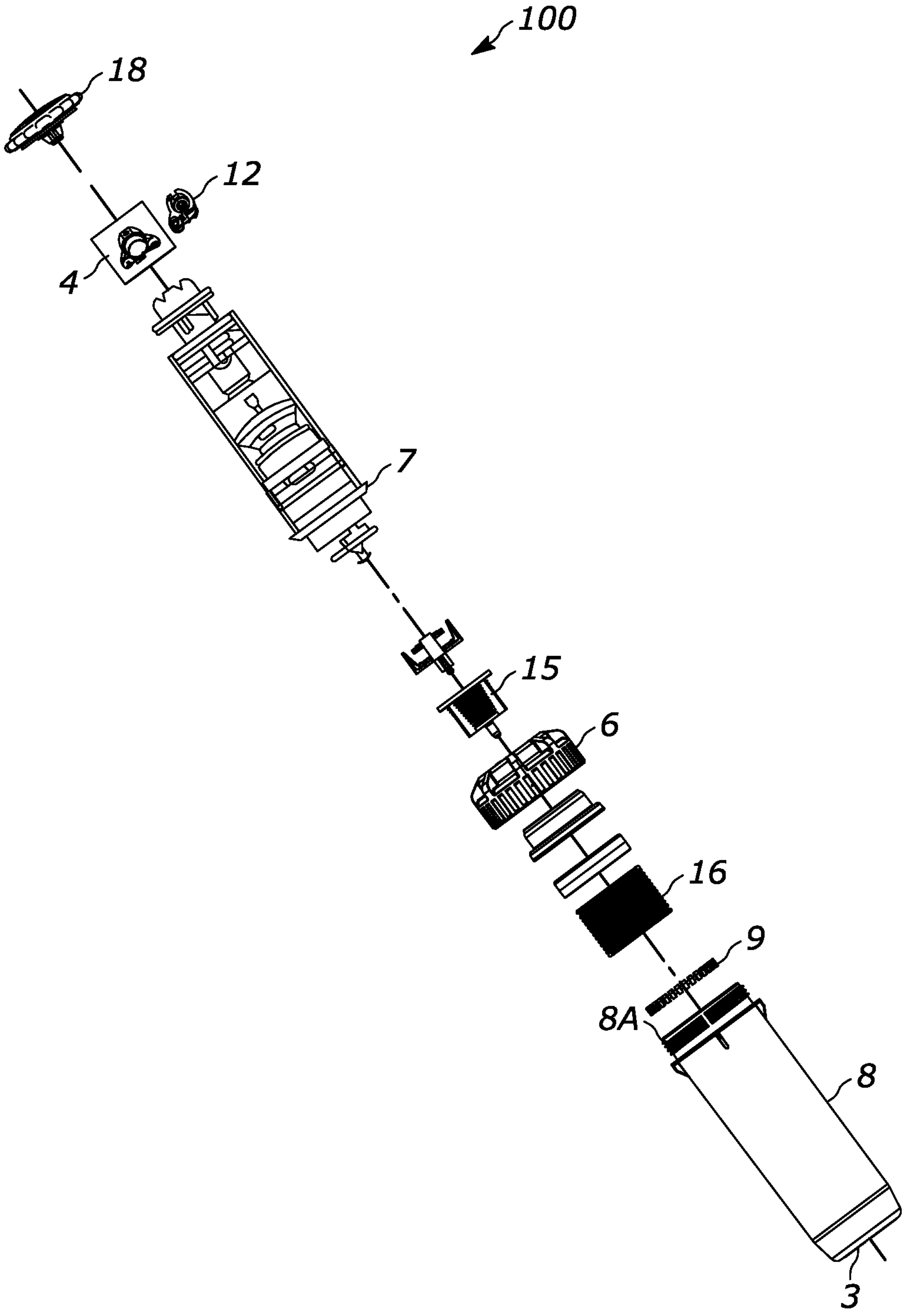
FIG. 2 is an exploded view of the rotor sprinkler of FIG. 1.
Figure 3:
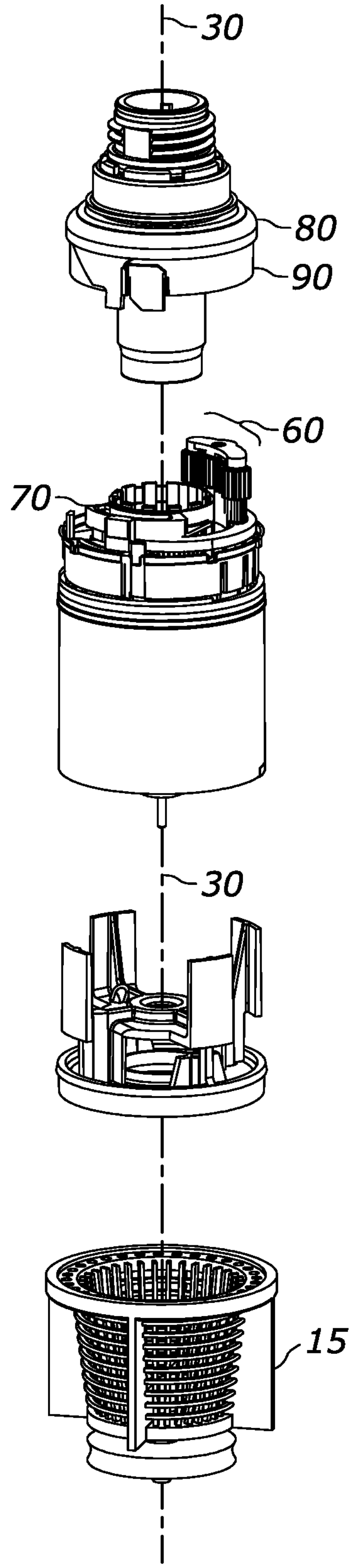
FIG. 3 is an exploded view of a subset of components of the rotor sprinkler of FIG. 1.
Figure 4:
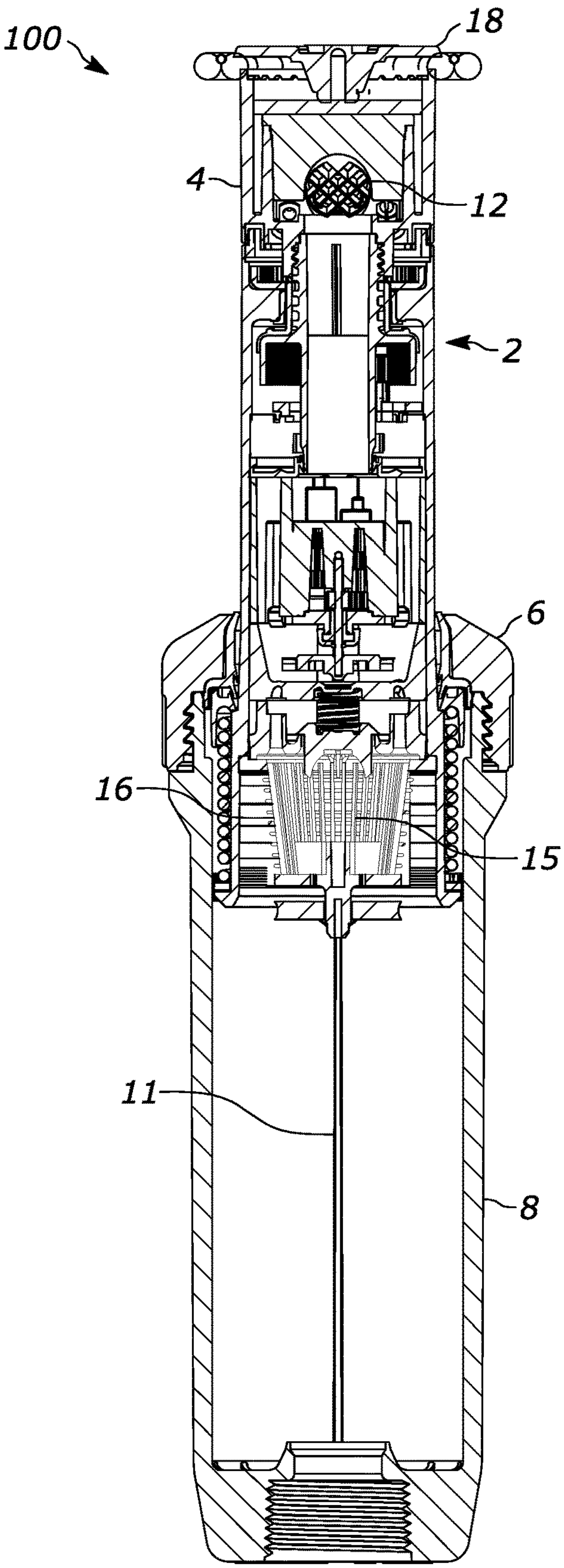
FIG. 4 is a cross-section view of the rotor sprinkler of FIG. 1 taken along line 4-4 of FIG. 1.
Figure 5:
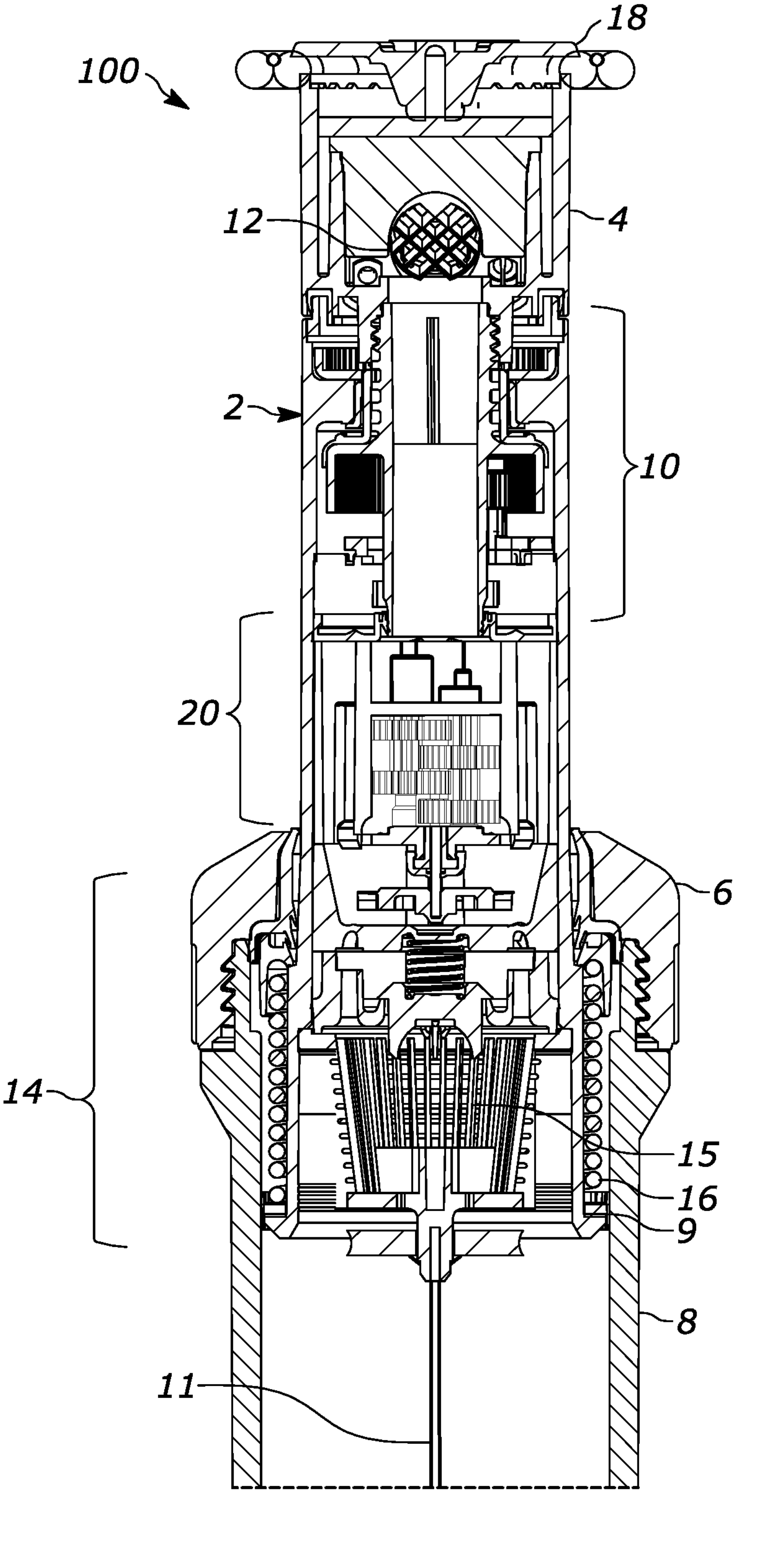
FIG. 5 is an enlarged cross-section view of a portion of FIG. 4.

As shown generally in FIGS. 1-5, an exemplary pop-up rotor sprinkler 100 having an improved arc setting mechanism 10 is illustrated. The sprinkler 100 enables adjustment between a part circle mode and a true full circle mode. The part circle mode allows one to set arc ranges to water an area less than a full circle. The true full circle mode enables full circle watering in one continuous direction (i.e., without reversing at any point). The sprinkler 100 further has a "memory arc" function, which enables the arc setting mechanism to return to an originally set angle of rotation in certain cases where the original angle has been subverted, for example, due to user mishandling of the rotor.

The rotor sprinkler 100 generally comprises a case or housing 8 having an inlet 3 for receiving fluid; a riser 2 including a plurality of components for managing fluid pressure and facilitating a desired spray mode; and a nozzle 12 (e.g., grid main nozzle) coupled to and disposed within a turret 4 for discharging pressurized fluid. The turret 4 is coupled to the riser 2 at a distal end away from the housing 8. The riser 2 extends from the housing 8 when water is turned on and retracts in the housing 8 using a retraction spring 16 when the water is turned off. Additional examples of rotor sprinklers may be found in U.S. Pat. Nos. 4,787,558; 5,383,600; and 6,732,950, and in U.S. Publication No. 2022/0297140, which are incorporated herein by reference in their entirety.

The housing 8 generally has an elongated cylindrical configuration formed typically from a lightweight injection molded plastic. The inlet 3 may be formed at one end of the housing 8 and receives pressurized fluid for irrigation. An opposite end 8A of the housing 8 may be configured (e.g., threaded) to accommodate mounting of a cover 6. The riser 2 is generally configured as an elongated hollow tube having a size and shape configured for slide-fit through the cover and reception into the interior of the housing 8. The riser 2 may also be constructed from a lightweight injection molded plastic.

A retraction spring 16 sits between the inside of a cover 6 of the housing 8 and a ratchet ring 9 at a bottom of the riser 2. The ratchet ring 9 sits above a bottom of a riser flange 7, and the retraction spring 16 sits into the ratchet ring 9. The ratchet ring 9 engages ribs 11 within the housing 8 and allows the riser 2 to slide and/or rotate if the torque exceeds the friction between the riser flange 7 and the ratchet ring 9. In operation, the water pressure overrides the bias of the spring 16, compresses the spring 16, and extends the riser 2 for irrigation. When the water is turned off, the spring 16 expands and urgers the riser 2 into a retracted position into the interior of the housing 8. Further, when the riser 2 is in a retracted position, a riser cap 18 at an outboard end of the turret 4 is substantially seated at least flush with the cover 6.

As water passes through the sprinkler 100, it also passes through a turbine regulator module 14, for effective water use by the sprinkler 100. The turbine regulator module 14 may also include a filter 15 for eliminating debris. A gear reduction mechanism 20 is disposed in the riser 2 downstream of the turbine regulator module 14 and drives rotation of the turret 4 for discharging fluid through the nozzle 12. The arc setting mechanism 10 is disposed within the riser 2 downstream of the gear reduction mechanism 20 and may be set to enable the part circle mode and the true full circle mode.

Figure 6A:
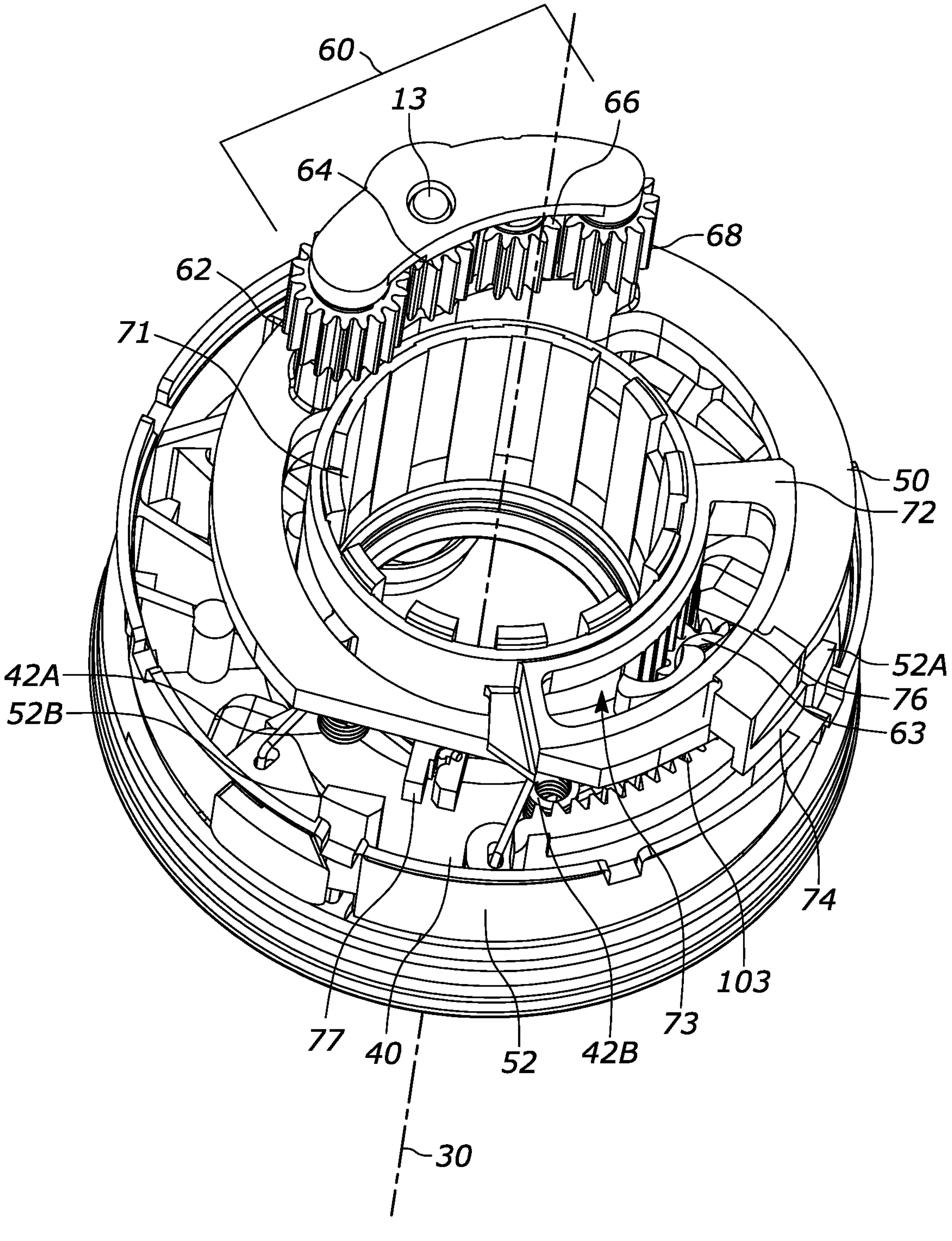
FIG. 6A is a perspective view of a gear rack, trip lever, and other components of an arc setting mechanism of the sprinkler of FIG. 1.
Figure 6B:
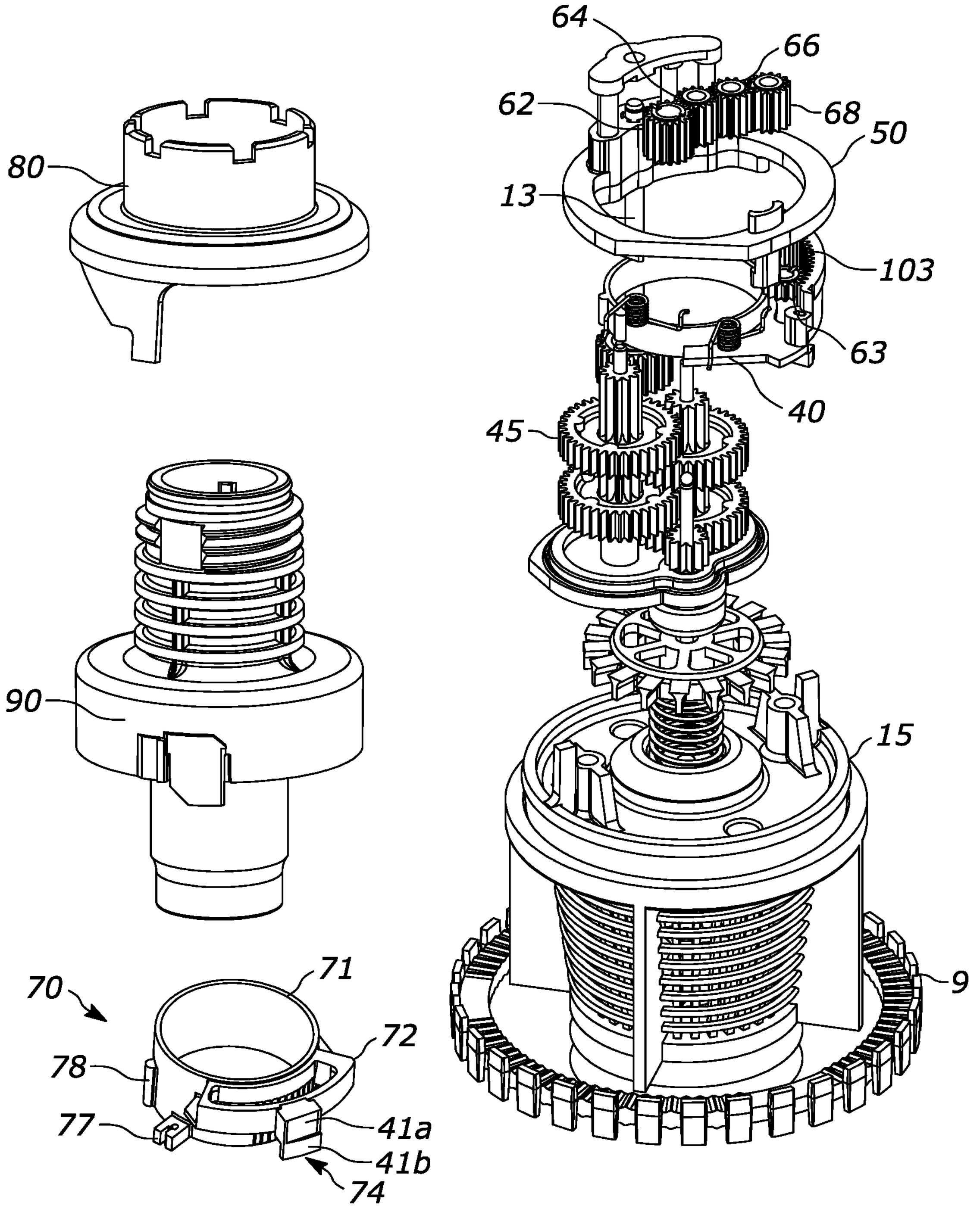
FIG. 6B is an exploded view of the arc setting mechanism and other components of the rotor sprinkler of FIG. 1.

As shown in FIGS. 6A and 6B, the arc setting mechanism 10 includes a gear rack 60, a trip lever 70 operatively coupled to a trip plate 50, a trip hood 80, a ring gear 90, and a trip mount 52 with two fixed stops 52A (right stop), 52B (left stop) that limit the movement of the trip lever 70 to a predetermined arcuate range. The components of the arc setting mechanism 10 work in cooperation with the gear reduction mechanism 20 to rotate the turret 4 to dispense water through the nozzle 12 for irrigation over a selected target terrain area. Operation of the part circle mode and the true full circle mode are described in further detail below with respect to FIGS. 10A-13F.

The gear rack 60 includes a plurality of gears including a first drive gear 62, an input gear 64, an idler gear 66, and a second drive gear 68. The gear rack 60 is operatively coupled to the arc setting mechanism 10 to determine the direction of rotation for the turret 4. For example, in a part circle mode, the gear rack 60 pivots back and forth between clockwise rotation of the turret 4 (when drive gear 68 is engaged) and counterclockwise rotation of the turret (when drive gear 62 is engaged). The input gear 64 directly drives drive gear 62 and indirectly drives drive gear 68 through the idler gear 66. The input gear 64 is driven by a drive shaft or shaft 13 that is driven by the gear reduction mechanism 20.

Figure 7A:
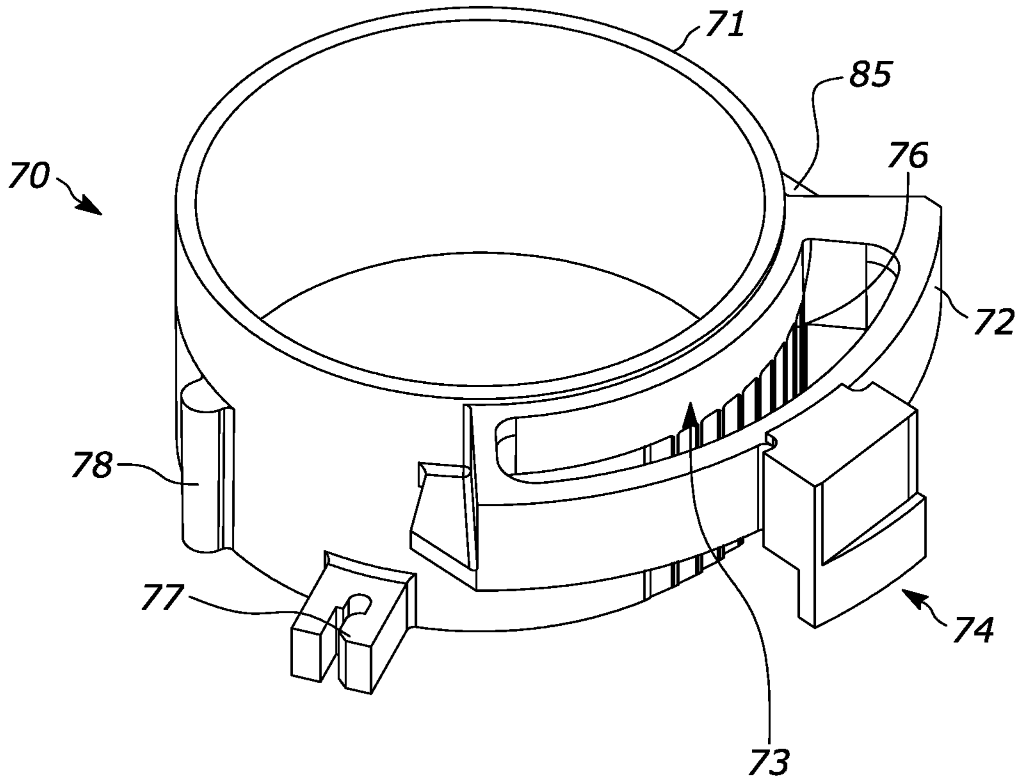
FIG. 7A is a perspective view of a trip lever in a neutral state of the sprinkler of FIG. 1.
Figure 7B:
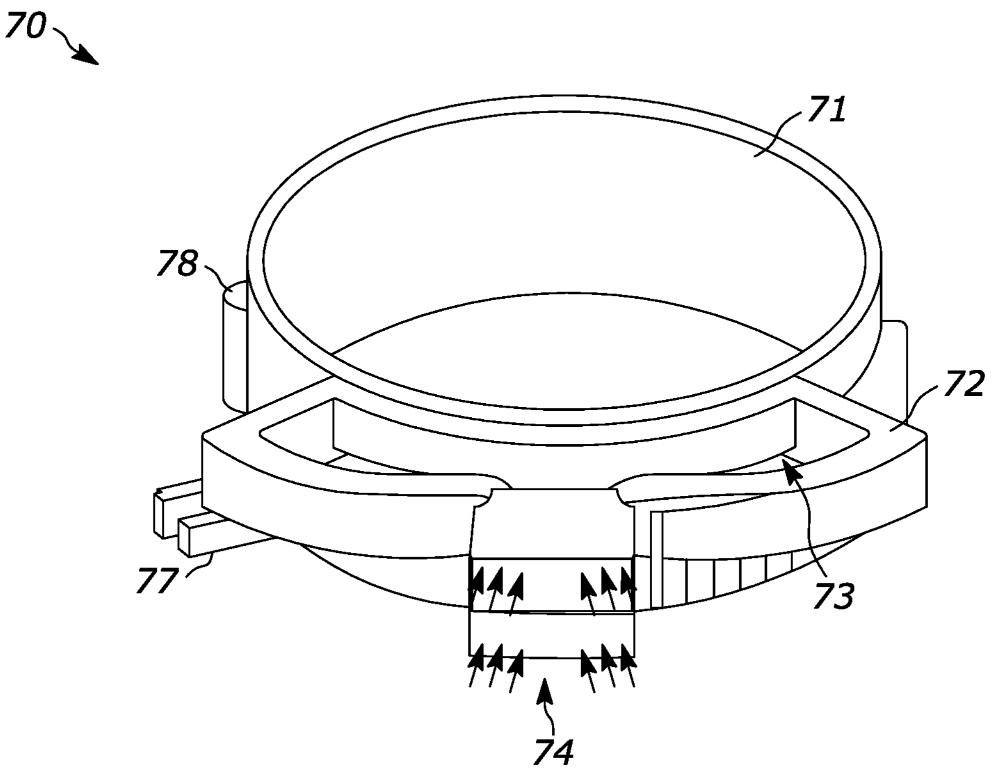
FIG. 7B is a perspective view of the trip lever of FIG. 7A in a deflected state.
Figure 7C:
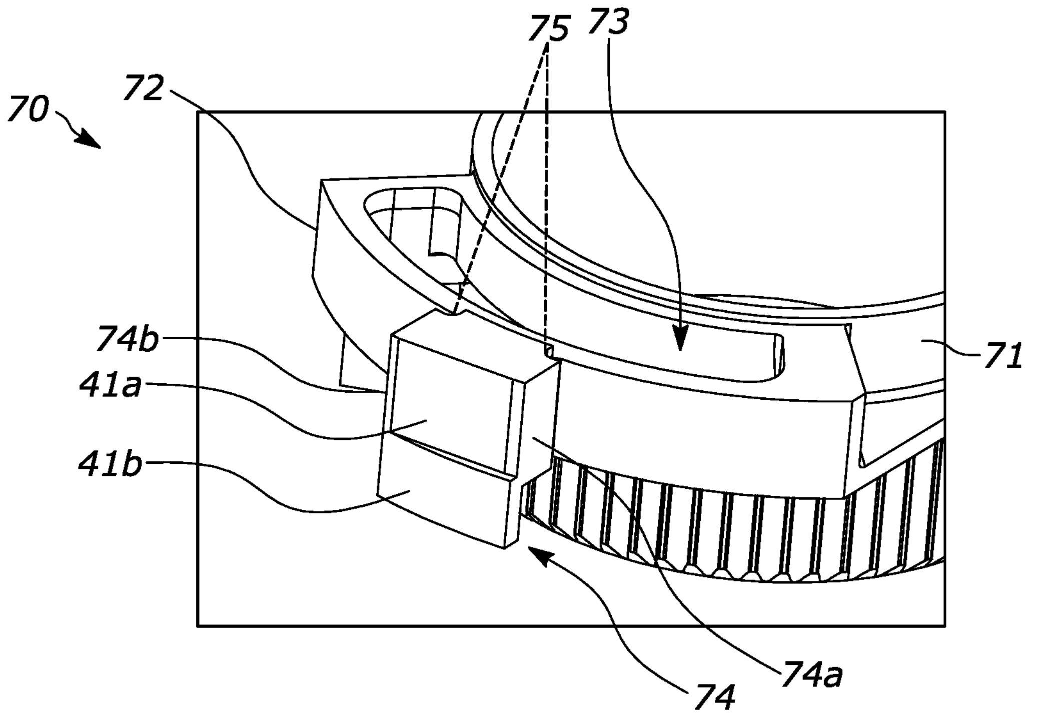
FIG. 7C is an enlarged perspective view of a portion of the trip lever of FIG. 7A.

With reference to FIGS. 7A-7C, the trip lever 70 generally includes a ring 71, an arcuate member 72, and a toggle 74. The materials of the components of the trip lever 70 are designed to cooperate with the mode of operation of the rotor sprinkler 100. For example, the arcuate member 72 may include an arcuate gap or coring 73 that allows radially inward flexibility. The arcuate gap or coring 73 may be defined between the ring 71 and the arcuate member 72. This inward flexibility enables the toggle 74 to move inward and allow tabs or trips 82 and 92 to pass by in full circle mode. In some embodiments, the toggle 74 may be also formed from a thermoplastic material. By one approach, the toggle 74 may be formed from a lubricated Acetal material to reduce friction as the trips pass by the toggle, and/or lubricant can be added to the toggle to reduce friction.

Figure 7D:
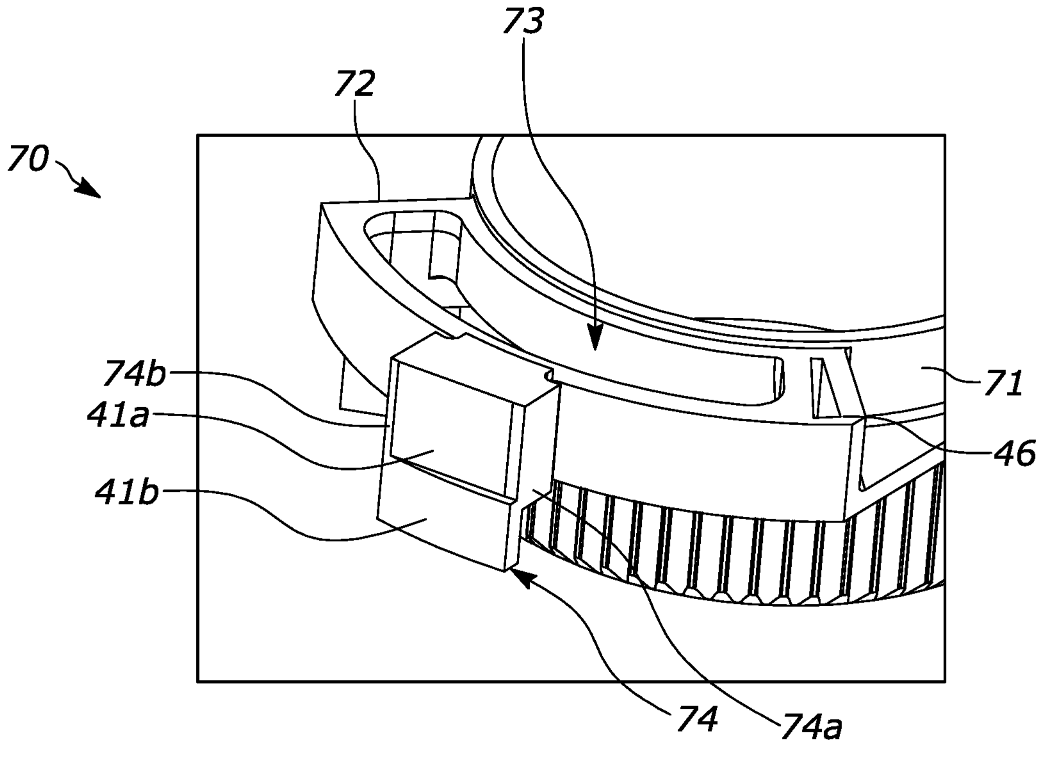
FIG. 7D is a perspective view of a portion of an alternative embodiment of a trip lever.

The arcuate member 72 may be formed with a stiffer response in a tangential direction. For instance, material at the connection of the arcuate member 72 to the ring 71 may be increased relative to that of the acuate member 72 itself. Further, a web 85 may extend between the arcuate member 72 and the ring 71. The arcuate member 72 may be formed with relatively less material to provide reduced stiffness in a radial direction, which facilitates inward radial movement of the toggle 74 and the arcuate member 72 to enable the full circle mode. As illustrated in FIG. 7D, in some embodiments the arcuate member 72 may include additional coring 46 of a side wall of the arcuate member 72 for reduced stiffness.

Figure 16:
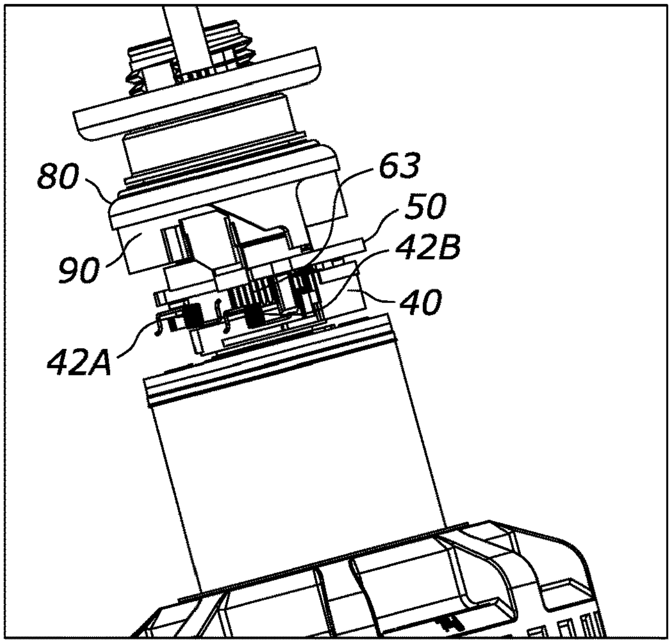
FIG. 16 is another perspective view of a subset of the components of the rotor sprinkler of FIG. 1, illustrating multiple trip springs and a rack idler.

The ring 71, the arcuate member 72, and the toggle 74 may be formed as a single piece. The trip lever 70 may also include a boss 78 configured to aide alignment of the ring 71 relative to a rack idler 40. A second idler gear 63, as shown in FIG. 6B and FIG. 16, moves the rack idler 40. The movement of the trip lever 70 drives movement of the rack idler 40 via the second idler gear 63 meshed with teeth 76 defined on an outer surface of the ring 71 and teeth 103 on the rack idler 40 as the toggle 74 toggles between the stops 52A, 52B. For instance, as the trip lever 70 and trip plate 50 move in one direction, the rack idler 40 moves in an opposite direction. During tripping, the rack idler 40 is moved to flip a trip spring 42B connected to the rack idler 40 and the trip plate 50. The trip plate 50 shifts the gear rack 60 to engage a drive gear for movement in an opposite direction, thereby reversing the direction of rotor.

As illustrated in FIG. 6A, an attachment arm 77 extends radially from the trip lever 70. A trip spring 42A is operatively connected to the trip lever 70 and the trip mount 52 to facilitate back and forth rotation of the trip lever 70. The attachment arm 77 defines a stepped notch 44 defined for attaching one end of the trip spring 42A in a secure fashion (as illustrated most clearly in FIGS. 10A and 10B). The stepped notch 44 prevents the trip spring 42A from dislodging in the event of air slam or other impact to the sprinkler 100. A further trip spring 42B, illustrated in FIG. 16, is operatively connected to the rack idler 40 and the trip plate 50.

Embodiments of the toggle 74 may have a stepped profile, as illustrated in FIGS. 6A-6B and 7A-7C. With reference to FIG. 7C, the stepped profile of the toggle 74 has a first portion 41*a* (i.e., upper portion) and a second portion 41*b* (i.e., lower portion). The first portion 41*a* may have a larger radial depth than the second portion 41*b* (as shown most clearly in FIG. 6B). The first portion 41*a* may also include an outer surface of the toggle that is angled or slanted relative to the arcuate member 72 or ring 71 and relative to the outer surface formed by the second portion 41*b*. The angled surface of the first portion 41*a* is configured to function as a ramp to facilitate clockwise passage of the tabs 82, 92 over the toggle in full circle mode. The toggle may include a first side wall 74*a* forming the lower end of the ramp, and a second side wall 74*b* forming the higher end of the ramp, the first side wall 74*a* extending to a smaller radius from the center of the ring 71 than the radius corresponding to the second side wall 74*b*. The second portion 41*b* of the toggle 74, extending at a substantially uniform radius from the ring 71, may extend to the same radius as the radius of the second side wall 74*b*, or may extend even further. The radial extension of the second portion 41*b* allows the second wall 41*b* to engage the stops 52A, 52B that limit movement of the ring 71 when it toggles between different directions of rotation in part circle mode.

As will be described in further detail below in reference to FIGS. 13A-13F, the gradually increasing radial extension of the ramp-like first wall 41*a* reduces the amount of force needed to inwardly deflect the toggle 74 in full circle mode to permit passage of the trips 82, 92. It also ensures that the friction between the fixed trip 92 and the toggle 74 in full circle mode is low enough that the fixed trip 92 does not trip the trip lever 70 to change the rotational direction of the sprinkler 100. The ramp-like surface of the first wall 41*a* also corresponds to an angled interior surface 95 of the fixed trip 92, described further below, which further reduces friction as the fixed trip 92 passes over the toggle 74.

Figure 7E:
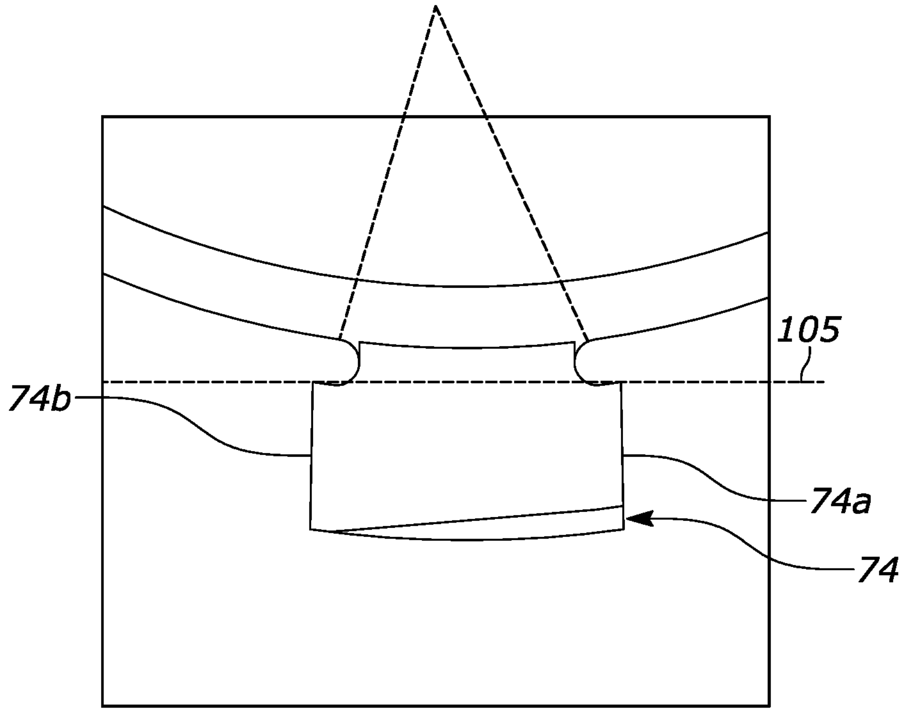
FIG. 7E is an enlarged view of a toggle of the trip lever of FIG. 7A.

As illustrated in FIGS. 7C and 7C, the toggle 74 may further define one or more notches or cut-outs 75, for example at the corners of the first wall 41*a* of the toggle 74 adjacent to the arcuate member 72. In some embodiments, the notches may have a curved shape. The notches 75 reduce rigidity of the toggle, thus improving flexibility of the toggle 74 and functioning as a lever arm for inward movement of the toggle 74 when it engages an angled interior surface 95 of the fixed trip 92 or the adjustable trip 82 in full circle mode. For instance, as one of the trips 82, 92 slides against the toggle 74, the toggle 74 can "see-saw" or pivot on the corner notches 75, deflecting inwardly on the right notch when the trip is sliding against the right side of the toggle 74, and then deflecting inwardly on the left notch when the trip is sliding against the left side of the toggle 74. The toggle 74 may also be configured so that the side walls 74*a* and 74*b* of the toggle form slightly oblique angles relative to a horizontal line 105 (shown in FIG. 7E). For instance, the side walls can be angled outwardly or inwardly up to about 10 degrees from normal relative to the horizontal line 105. For example, in some embodiments, the angle of the side walls can range from about 1 degree to about 5 degrees from normal relative to the horizontal line 105, for example, about 2 degrees. The side walls 74*a*, 74*b* may terminate at the notches 75. The tapered side walls 74*a*, 74*b* can permit ease of passage of the trips over the toggle during full circle mode. They can also reduce torque to facilitate the memory arc function of the rotor described in further detail below.

A deflected state of the toggle 74 is illustrated in FIG. 7B. An undeflected state of the trip lever 70 is illustrated in FIGS. 7A and 7C. The gap 73 defined between the arcuate member 72 and the ring 71 is smaller in size as the toggle

74 passes the fixed trip 92 in the full circle mode. More specifically, the gap 73 has a first size when the toggle 74 is spaced from the fixed trip 92 and a second size when the toggle 74 is deflected inward by the fixed trip 92, the first size being larger than the second size. Additional features of the full circle mode will be described in further detail with respect to FIGS. 12A-13F.

Generally, the alignment and positioning of the adjustable trip 82 relative to the fixed trip 92 determines the mode of operation of the rotor sprinkler 100. When the adjustable trip 82 has been adjusted until the point where it is forced onto a projection or boss 91 on the ring gear 90 just ahead of the fixed trip 92, and deflected radially outward due to the boss 91, the sprinkler 100 is in full circle mode. When the adjustable trip 82 has not been adjusted until is forced onto the boss 91, and the adjustable trip 82 is in its neutral, undeflected position, the sprinkler 100 is in part circle mode.

Figure 8:
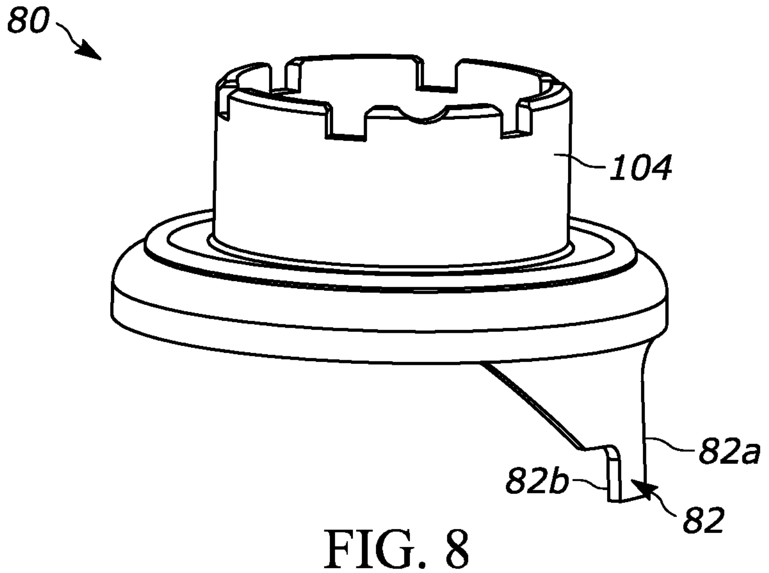
FIG. 8 is a perspective view of a trip hood of the arc setting mechanism of the rotor sprinkler of FIG. 1.

Referring to FIG. 8, the trip hood 80 of the arc setting mechanism 10 includes the adjustable trip 82. The trip hood 80 and the adjustable trip 82 may be a single piece. The adjustable trip 82 includes a first side 82A (e.g., a right side) and a second side 82B (e.g., a left side). The first side 82B is configured to engage and push the toggle 74 towards stop 52B while in part circle mode.

Figure 9A:
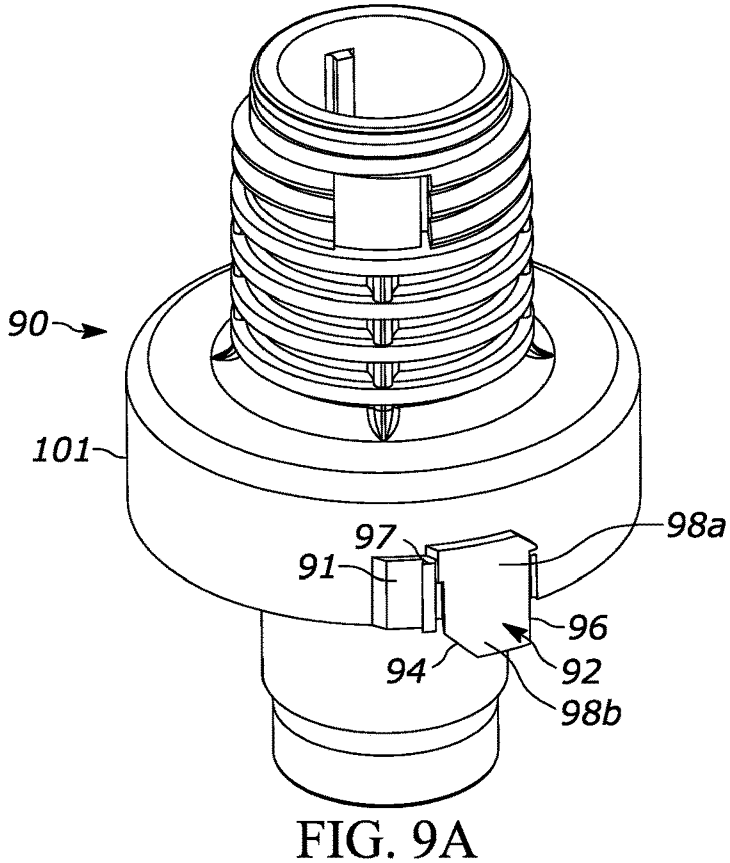
FIG. 9A is a perspective view of a ring gear of the arc setting mechanism of the rotor sprinkler of FIG. 1.

With reference to FIG. 9A, the ring gear 90 includes a ring portion 101 and a fixed trip 92 which extends from the ring portion 101. Other views of the ring gear 90 are illustrated in FIGS. 9B to 9E. The fixed trip 92 includes one side 96 (e.g., a right side) configured to engage and push the toggle 74 towards stop 52A in the counterclockwise direction while in part circle mode. The fixed trip 92 also includes an angled side 94 (e.g., an angled left side) configured to permit the fixed trip 92 to pass over the toggle 74 in the clockwise direction without tripping the trip lever 70.

Specifically, the angled side 94 functions as a leading edge of the fixed trip 92 as the fixed trip contacts the toggle 74 in the clockwise direction. The angled configuration reduces the surface area of the leading contact between the fixed trip 92 and toggle 74, which reduces friction as the fixed trip 92 slides against the toggle 74. The angled side 94 of the fixed trip 92 further includes or is adjacent to an angled interior surface 95 of the fixed trip 92. The angled interior surface 95 further reduces friction and facilitates movement of the fixed trip 92 along the ramp-like surface of the first wall 41*a* of the toggle 74.

Figure 9B:
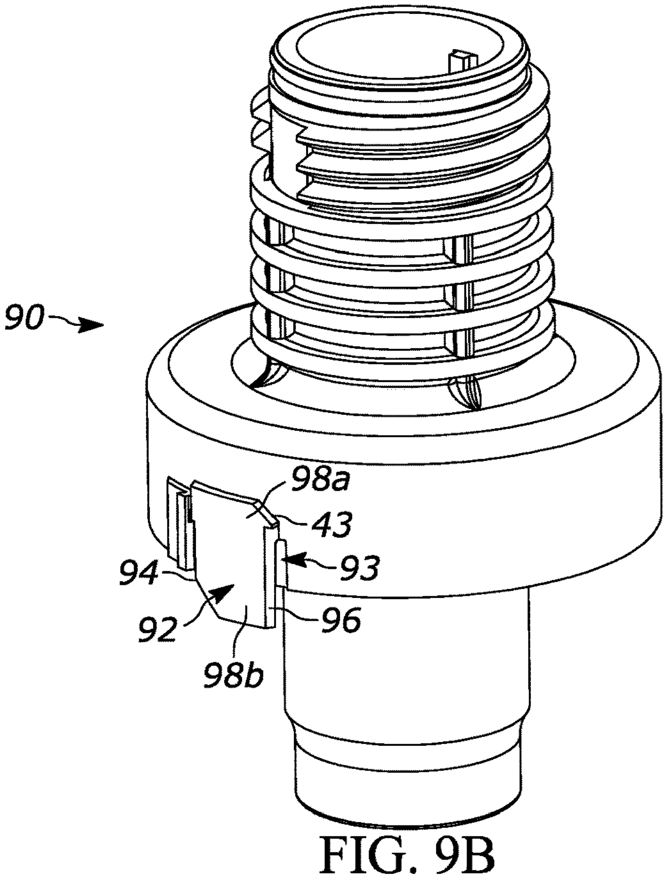
FIG. 9B is another perspective view of the ring gear of FIG. 9A.
Figure 9C:
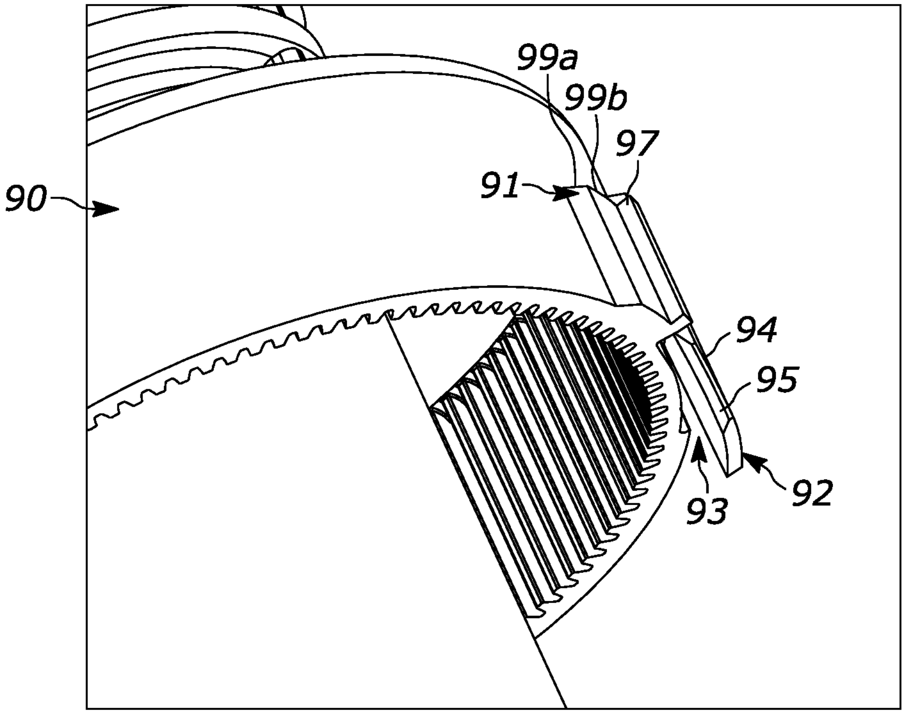
FIG. 9C is an enlarged perspective view of a portion of the ring gear of FIG. 9A.
Figure 9D:
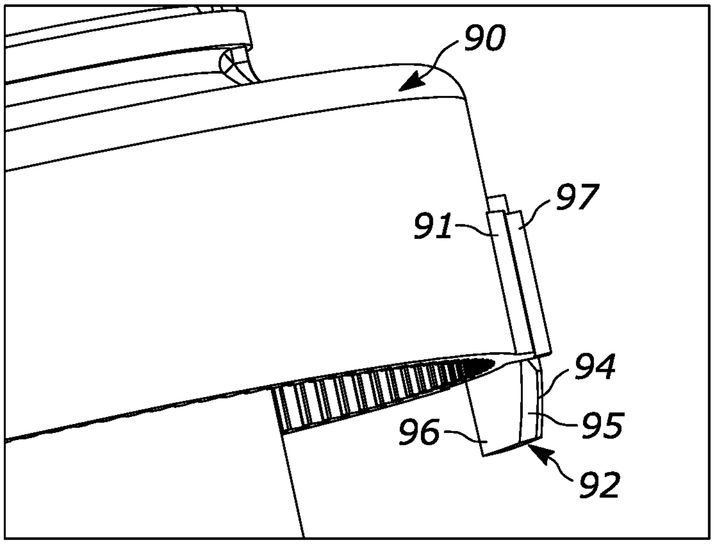
FIG. 9D is an enlarged perspective view of another portion of the ring gear of FIG. 9A.
Figure 9E:
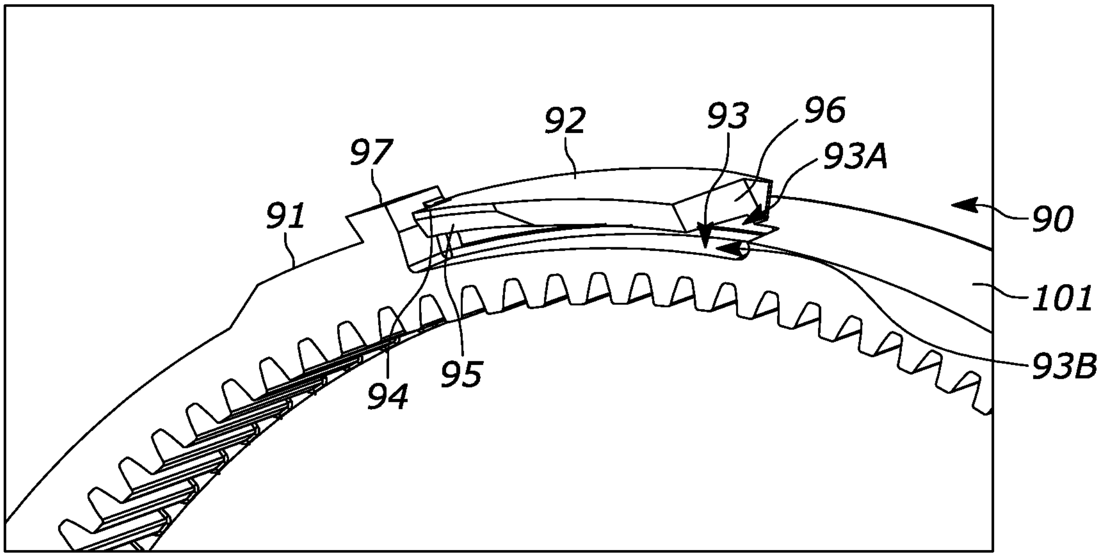
FIG. 9E is an enlarged bottom perspective view of a portion of the ring gear of FIG. 9A.

The above-described configurations of the fixed trip 92 and the toggle 74 may facilitate radially inward deflecting of the toggle 74 as the fixed trip 92 passes over the toggle. In addition, the configurations may facilitate a radially outward deflecting of the fixed trip 92. With reference to FIGS. 9B, 9C, and 9E, a gap 93, which may be formed at least in part by coring 93A of the fixed trip 92 and/or coring 93B of ring portion 101 of the ring gear 90, may also exist between the fixed trip 92 and the ring gear 90 to facilitate the outward deflecting of the fixed trip 92. The gap or coring 93, for instance, can continuously extend from both a lower portion 98*b* of the fixed trip (which contacts the toggle 74) and an upper portion 98*a* of the fixed trip (which does not contact the toggle 74). The gap or coring 93 extending into the upper portion 98*a* of the fixed trip 92 contributes to the flexibility and robustness of the fixed trip 92 as it rotates in full circle mode. Stress on the lower portion 98*b* of the fixed trip 92 from the toggle 74 is more evenly distributed across a substantial portion of the fixed trip 92 including the upper portion 98*a*. This creates a living hinge effect at the upper portion 98*a* of the fixed trip 92 which further reduces the force required to radially deflect the fixed trip 92 for smooth passage over the toggle 74.

With reference to FIG. 9A, a boss 91 and a stop 97 extend radially outward from the ring gear 90 just ahead of the upper portion 98*a* of the fixed tab 92 and adjacent thereto. The fixed trip 92 is adjacent to or contiguous with the stop 97, which is adjacent to or contiguous with the boss 91. The boss 91 and stop 97 may be integrally formed and in some embodiments may be integral with the ring gear 90. As illustrated in FIG. 9C, the stop 97 has a larger radial extension (i.e., is "raised") relative to the boss 91. The boss 91 includes a radially slanted, or inclined, ramp-like side wall or surface 99*a* leading to a radially extended surface 99*b* of the boss adjacent the stop 97. The boss 91 and the stop 97 are configured to allow the adjustable trip 82 to be adjusted into a configuration which enables true full circle mode (described further below in reference to FIGS. 12-13F).

Figure 10A:
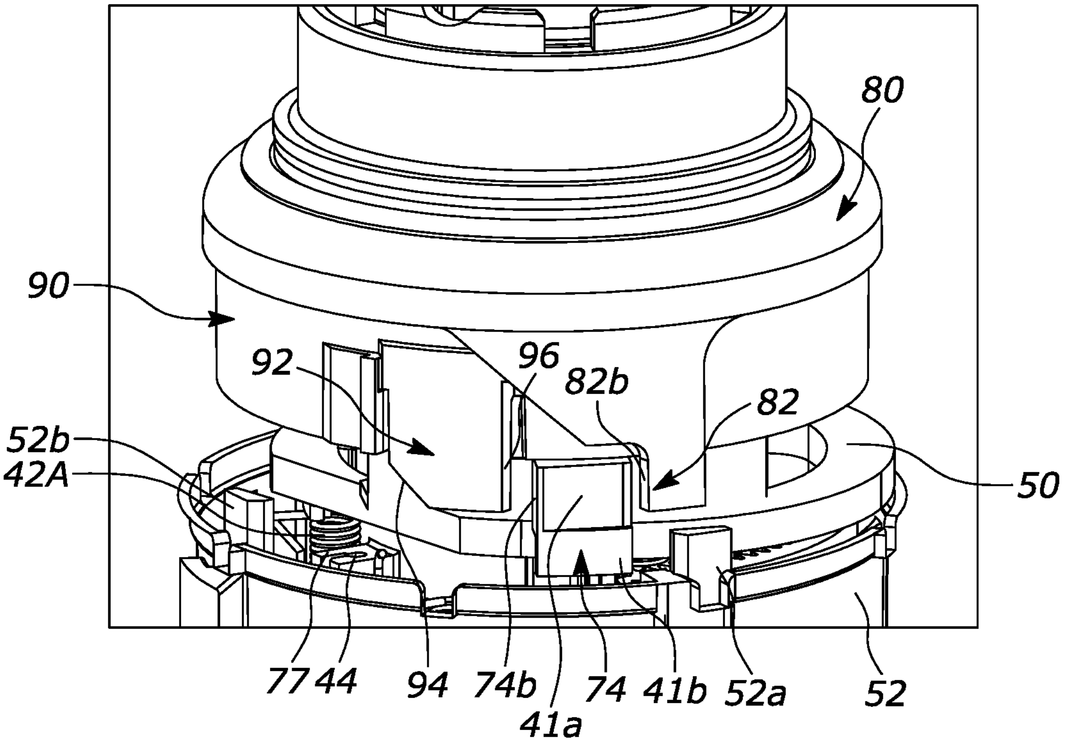
FIG. 10A is a perspective view of the arc setting mechanism of the rotor sprinkler of FIG. 1 in part circle mode.
Figure 10B:
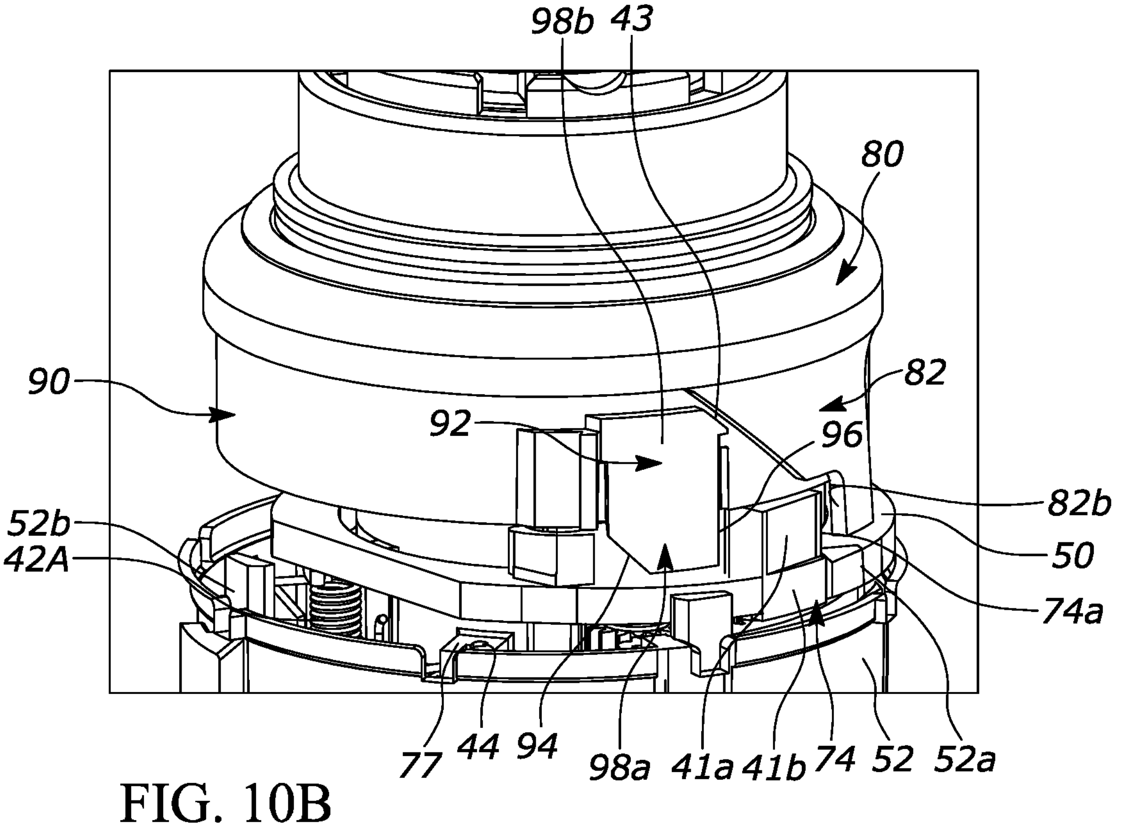
FIG. 10B is another perspective view of the arc setting mechanism of FIG. 10A.
Figure 11:
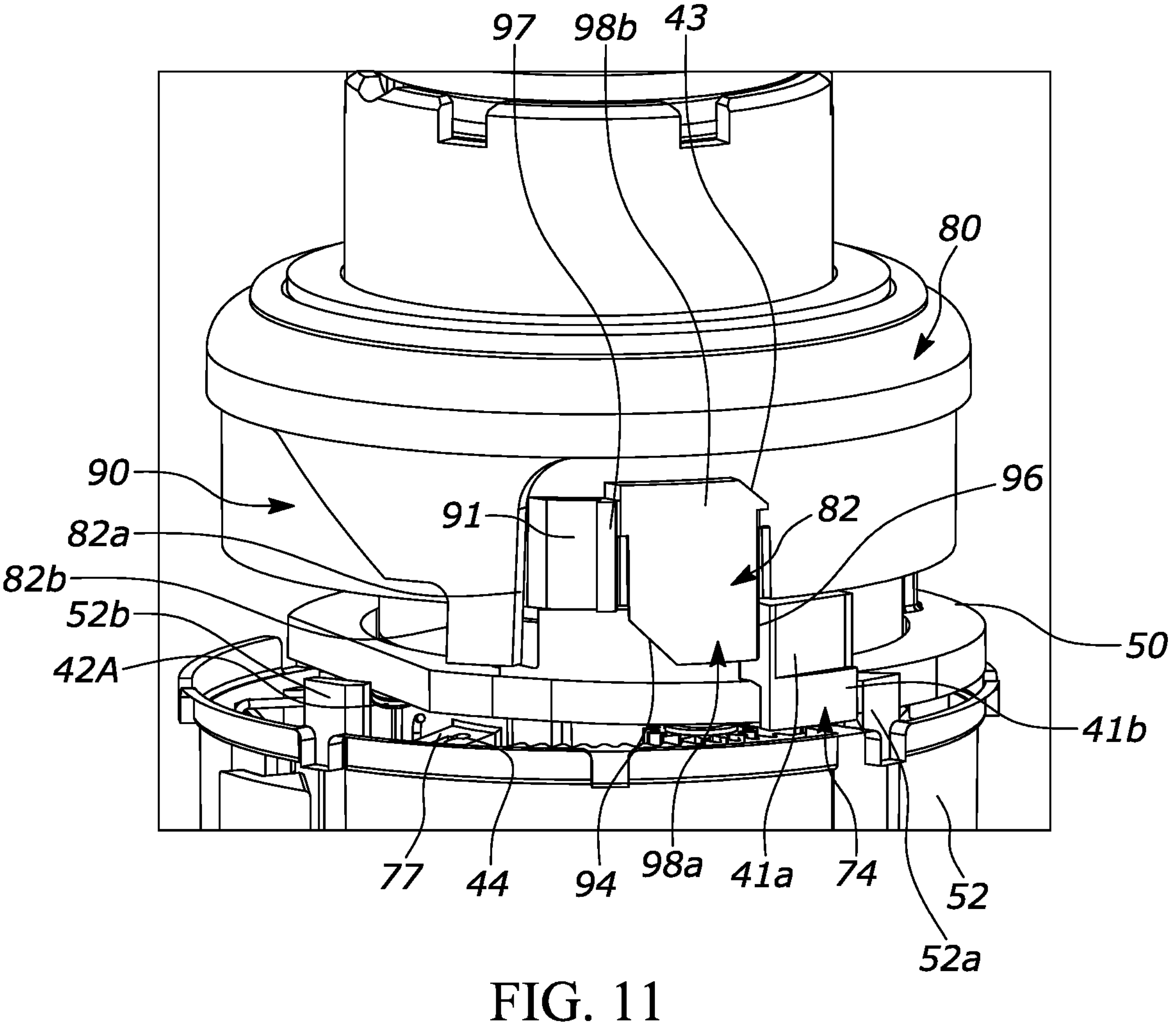
FIG. 11 is another perspective view of the arc setting mechanism of FIG. 10A set in part circle mode in a different configuration.

FIGS. 10A-11 illustrate a minimum arc part circle mode setting for the adjustable trip 82 and the fixed trip 92. With reference to FIG. 10B, the upper portion 98*a* of the fixed trip 92 may have an angled corner cut out 43 that corresponds to and can abut an angled upper portion of the adjustable trip 82 as the arc setting mechanism is adjusted, resulting in the minimum arc setting. In this setting, the lower portions of the trips 82 and 92 are set close to each side of the toggle 74 and rotate in the same direction until one of them engages the toggle 74 and moves the toggle 74 from one of the stops 52A, 52B to the other of stops 52A, 52B. Once the toggle is moved, the trips 82, 92 rotate in the other direction until one of them engages the toggle 74 and moves the toggle to the other stop 52A, 52B.

More specifically, with reference to FIGS. 10A and 10B, the left side 82B of the adjustable trip 82 on the trip hood 80 is illustrated as it is about to contact the right side wall 74A of the toggle 74 on the trip lever 70, when rotating in the clockwise direction. This contact will initiate moving the toggle 74 from one stop 52A to the other stop 52B. Once the toggle 74 contacts the other stop 52B, counterclockwise rotation will begin. The fixed trip 92 will soon contact the left side 74B of the toggle 74 and initiate moving the toggle 74 back to stop 52A. Once the trip lever 70 contacts the stop 52A, clockwise rotation will start. Thus, in this configuration, the arc of coverage matches the arcuate distance between the stops 52A, 52B. The trip spring 42A maintains the toggle 74 at one of the stops 52A, 52B until contacted to move to the other of the stops 52A, 52B.

FIG. 11 illustrates a maximum arc of coverage in part circle mode. In this configuration, the adjustable trip 82 and the fixed trip 92 are close to one another but to one side of the toggle 74. Specifically, the adjustable trip 82 and fixed trip 92 are only separated by the boss 91 and the stop 97 disposed on the ring gear 90, the adjustable trip 82 adjusted to a position immediately adjacent the boss 91 (e.g., adjacent to or in adjacent contact with the boss, without overlapping the boss). During clockwise rotation, the left side 82B of the adjustable trip 82 engages the right side 74A of the toggle 74. This contact initiates the toggle 74 to move from stop 52A to stop 52B. Once the toggle 74 engages stop 52B, counterclockwise rotation will begin. In a counterclockwise rotation, the fixed trip surface 96 ultimately engages a left side 74B of the toggle 74. When that contact occurs, the toggle 74 will move from stop 52B back to stop 52A, and the rotation will be reversed back to clockwise, as illustrated in FIG. 11. This switching back and forth in rotation continues until the watering cycle is complete.

Figure 15:
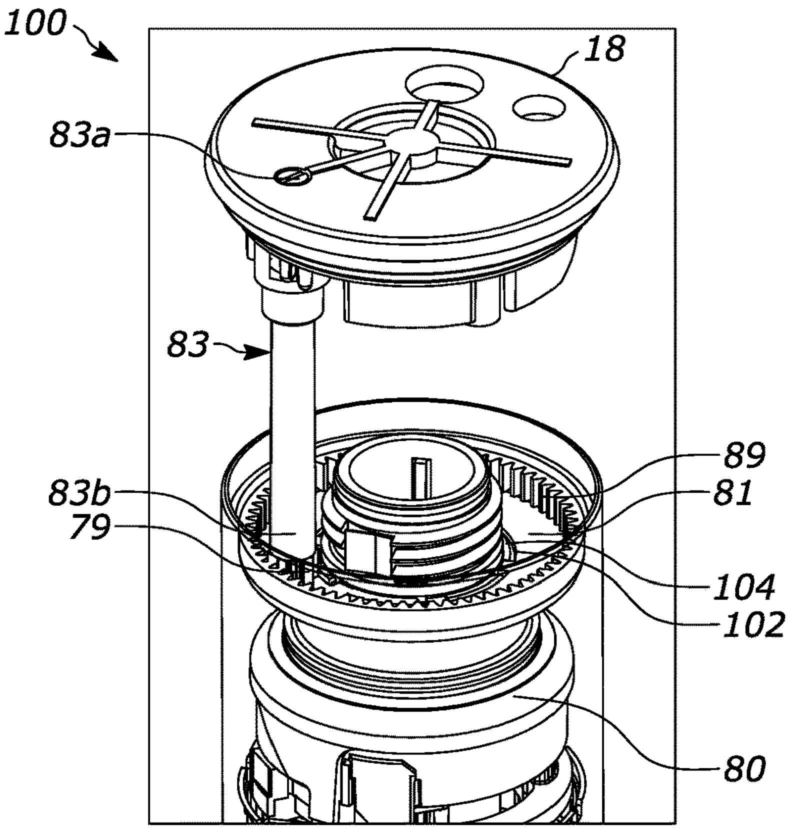
FIG. 15 is a cross-section view of a subset of the components of the rotor sprinkler of FIG. 1.

The adjustment of the arc pattern in part circle mode to the minimum or maximum arc positions described above, or any positions therebetween, occurs via an arc adjustment stem 83 that is accessible through the cover 18 of the turret 4, as shown in FIG. 15 (with the turret 4 housing removed). The stem 83 ultimately adjusts the adjustable trip 82 relative to the fixed trip 92 to set the arc pattern in part circle mode. The stem 83 extends upstream in the turret 4 and operatively couples to an adjustment ring 81. The stem 83 has an outboard end 83*a* configured to be manually turned by a tool, such as a screwdriver, and an inboard end 83*b* which includes teeth 79 that mesh with inner teeth 89 on the adjustment ring 81. When the stem 83 is turned, it rotates the adjustment ring 81. The adjustment ring 81 is operatively coupled to the trip hood 80 so that the trip hood 80 rotates with the adjustment ring 81. In this case, the adjustment ring 81 is keyed to the trip hood 80 through notches 102 on the adjustment ring 81 that receive projections 104 extending from the trip hood 80.

Figure 12:
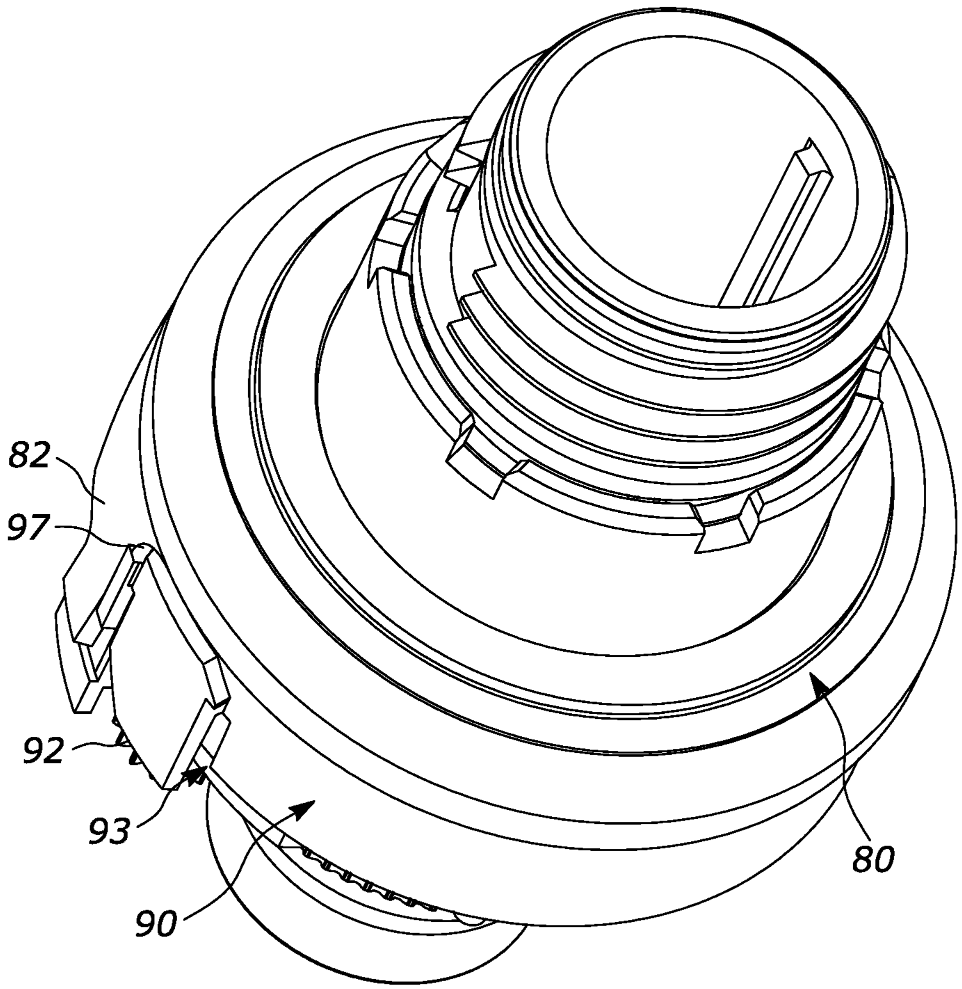
FIG. 12 is a perspective view of the ring gear and the trip hood of the arc setting mechanism of the rotor sprinkler of FIG. 1 in full circle mode.
Figure 13A:
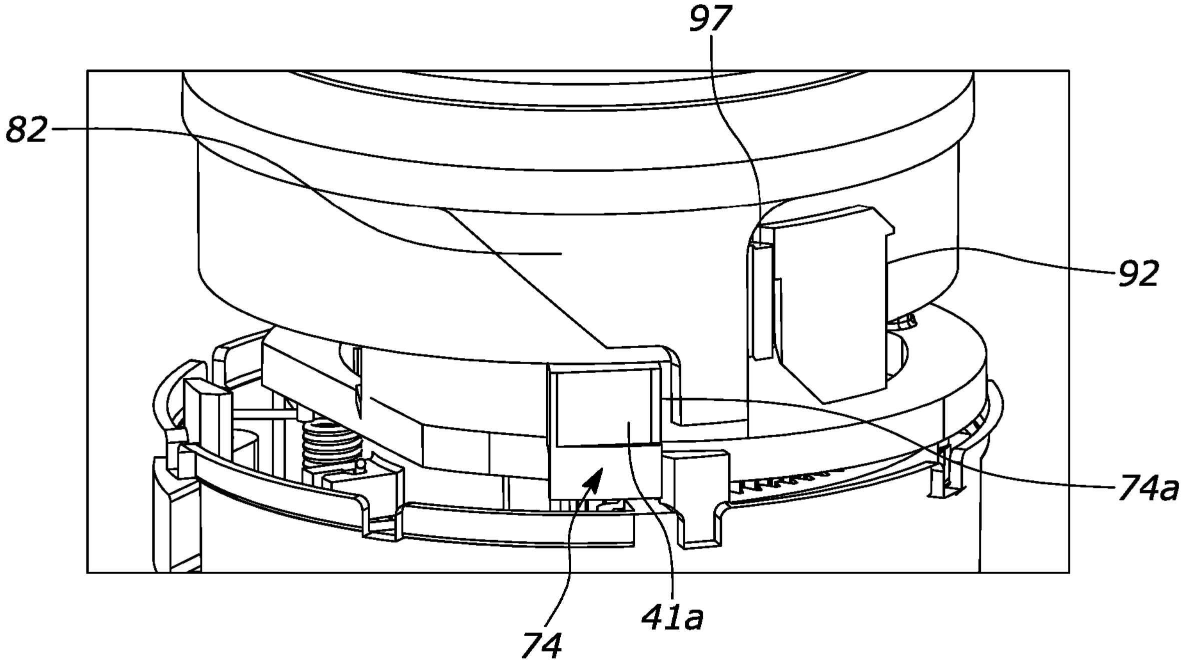
FIG. 13A is perspective view of the arc setting mechanism of the rotor sprinkler of FIG. 1 in full circle mode before the adjustable tab of the trip hood passes over the toggle.
Figure 13B:
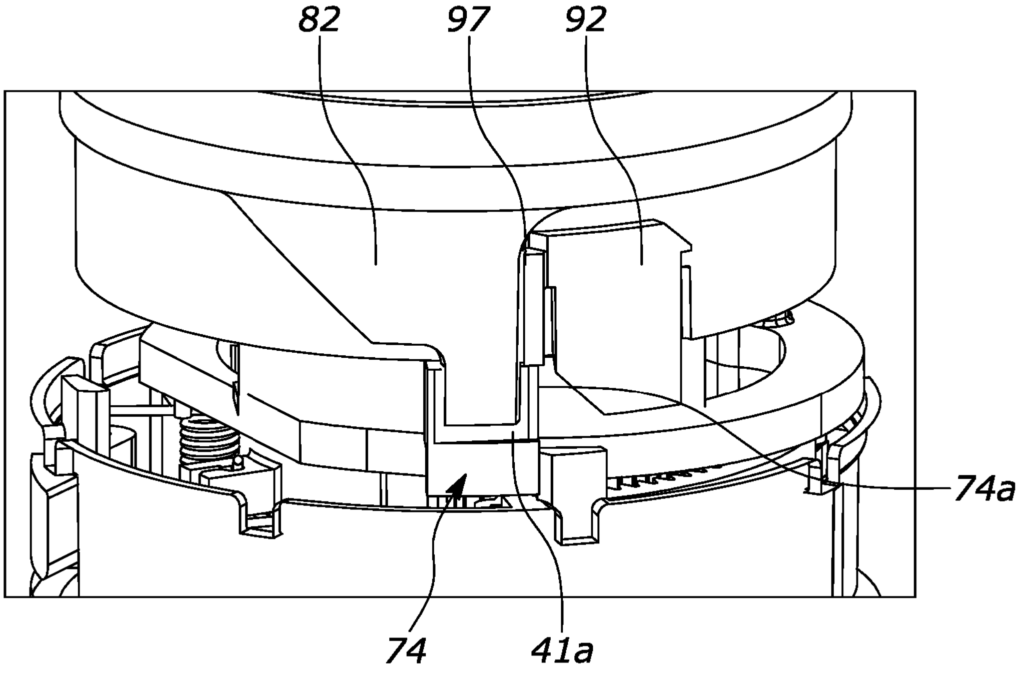
FIG. 13B is a perspective view of the arc setting mechanism of the rotor sprinkler of FIG. 1 in full circle mode as the adjustable tab of the trip hood passes over the toggle.
Figure 13C:
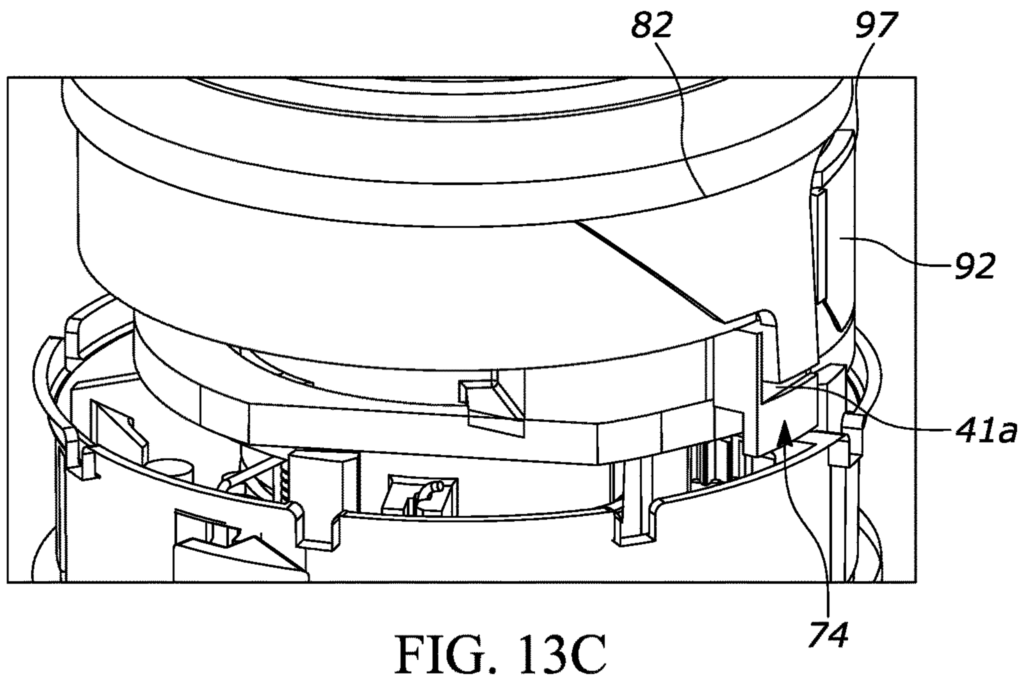
FIG. 13C is an alternative perspective view of the arc setting mechanism of the rotor sprinkler of FIG. 1 in full circle mode as the adjustable tab of the trip hood passes over the toggle.

The rotor sprinkler 100 uses the same arc adjustment stem 83 to operate the part circle mode and to set the rotor sprinkler 100 to full circle mode. In some embodiments, to engage full circle mode, one turns the stem 83 counterclockwise until the movement is stopped by engagement of an upper portion of the right side 82A of the adjustable trip 82 with the stop 97 on the ring gear 90. With reference to FIGS. 12 and 13A, just ahead of the stop 97, the slanted, ramp-like surface 99*a* of the boss 91 facilitates movement of the adjustable trip 82 radially outward and onto the radially extended surface 99*b* of the boss 91 where it comes to a rest in a radially outward position when it hits the stop 97. The boss 91 has a radial extension that forces at least a portion of the adjustable trip 82 to deflect radially outward. With the adjustable trip 82 radially deflected outward, the adjustable trip 82 can pass or deflect over the toggle 74 in the clockwise direction without tripping, as shown in FIGS. 13B and 13C, shortly followed by the fixed trip 92. The adjustable trip 82 remains in its deflected state seated on the boss 91 while the sprinkler is in full circle mode. Only when the sprinkler 100 is adjusted back to part circle mode, the adjustable trip 82 moved back off the boss 91, does the adjustable trip 82 return to its neutral, undeflected state.

It is further noted that in the full circle configuration the adjustable trip 82 and the fixed trip 92 remain separate from one another, that is, do not touch or overlap. The stop 97 not only prevents the adjustable trip 82 from being rotated/adjusted off the boss 91 in the direction of the stop 97, but further prevents the adjustable trip 82 from being adjusted onto the fixed trip 92 into such a touching or overlapping position. Keeping the trips 82, 92 apart precludes a potential stiff overlapping area that can make it difficult for the fixed trip 92 to deflect outwards as needed in full circle mode. This may consequently put too much stress on the trip lever 70 and/or slow down the passage of the trips over the toggle 74. Fully separating the adjustable trip 82 and fixed trip 92, on the contrary, permits the fixed trip 92 to deflect outwards with greater ease and to pass smoothly over the toggle 74, without needing to exert too much force on the toggle 74.

FIG. 13C illustrates an enlarged view of the deflected adjustable trip 82 passing over the toggle 74 in full circle mode. The adjustable trip 82 is deflected radially outwards from the boss 91 an amount that allows the adjustable trip 82 to slide against the toggle 74 at the first wall 41*a* of the toggle without tripping it. The ramp-like surface of the first wall 41*a* facilitates this passage of the adjustable trip 82 on the toggle 74. It is noted that, though deflected outwards, the adjustable trip 82 remains close enough to the first wall 41*a* of the toggle 74 that it is in contact with the toggle 74 as it passes.

In some embodiments, the radially deflected adjustable trip 82 slides against the toggle 74 without any appreciable force, or with very minimal force, being exerted in either direction between the toggle 74 and the adjustable tab 82. That is, though the adjustable trip contacts the toggle 74 as it passes the toggle 74, the adjustable trip 82 may slide past the toggle 74 with substantially no, or very minimal, additional deflecting of the adjustable trip 82 or deflecting of the toggle 74. In other embodiments the adjustable trip 82 may exert an amount of force on the toggle 74 as it passes, pressing the toggle 74 or a portion of the toggle 74 (and/or the arcuate member 72) slightly radially inward. Alternatively, or in addition, as the adjustable tab 82 passes over the toggle 74 the adjustable trip 82 may be forced by the toggle 74 to slightly deflect further radially outward to enable the passage. In any case, the adjustable trip 82 rotates past the toggle 74 without tripping the trip lever 70.

Figure 13D:
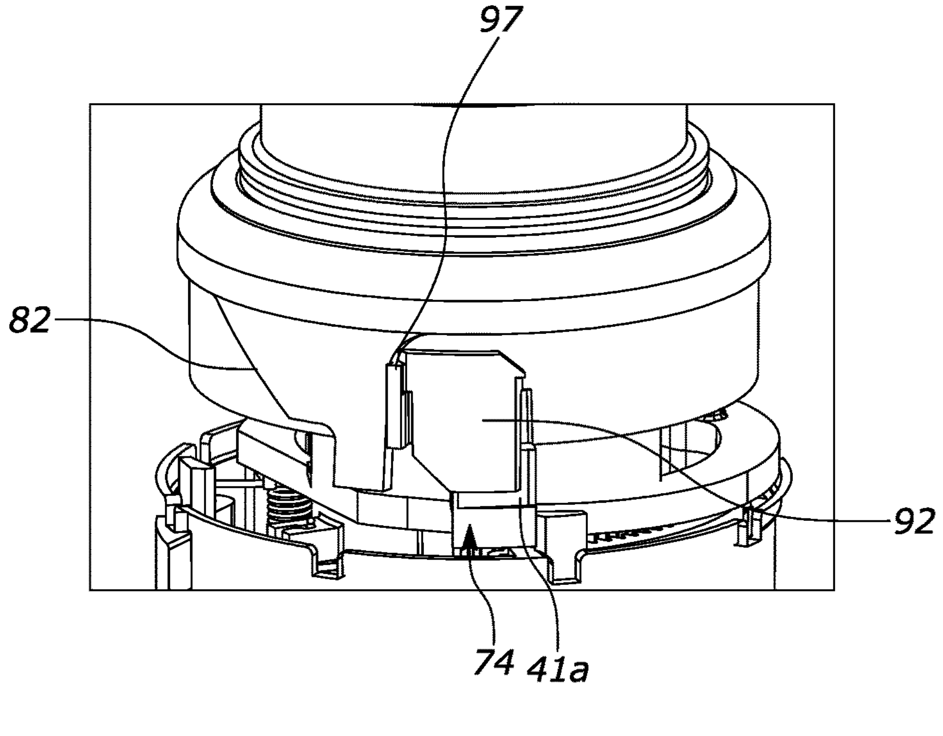
FIG. 13D is a perspective view of the arc setting mechanism of the rotor sprinkler of FIG. 1 in full circle mode as the fixed tab of the ring gear passes over the toggle.
Figure 13E:
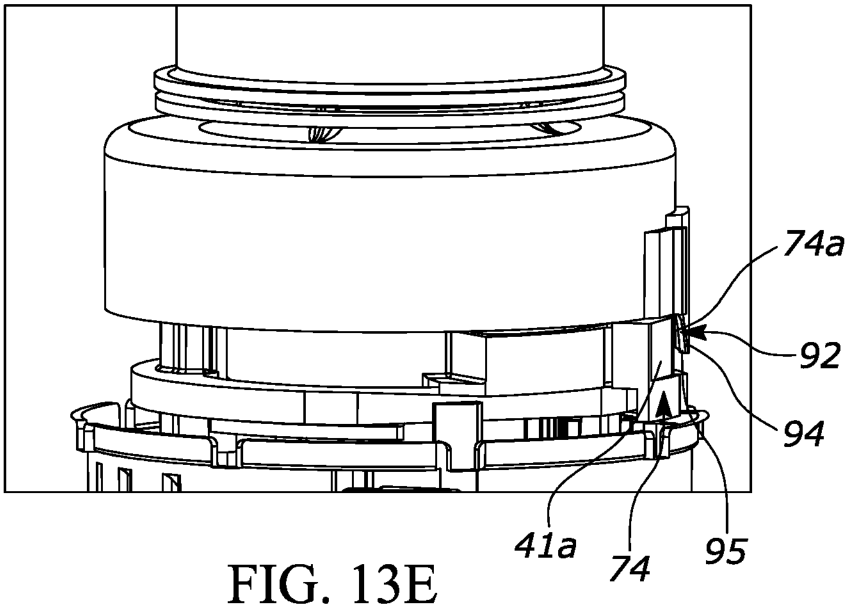
FIG. 13E is another perspective view of the ring gear and the trip lever of the arc setting mechanism of the rotor sprinkler of FIG. 1 in full circle mode as the fixed tab passes over the toggle.
Figure 13F:
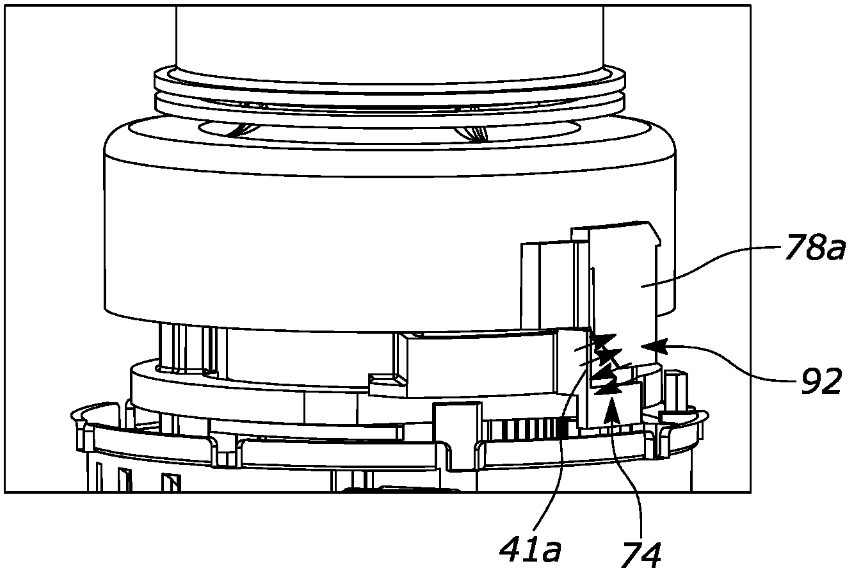
FIG. 13F is another perspective of the ring gear and the trip lever of the arc setting mechanism of the rotor sprinkler of FIG. 1 in a full circle mode as the fixed tab passes over the toggle.

After the adjustable trip 82 passes over the toggle 74 in full circle mode, the fixed tab 92 passes over the toggle 74. The combination of the structure of the toggle 74 and the structure of the fixed trip 92, as described above, permits the fixed tab 92 to slide against the toggle 74 in the clockwise direction without tripping it, as illustrated in FIGS. 13D-13F. FIG. 13E shows a side view perspective of the mechanism as the fixed trip 92 is about to make initial contact with the toggle 74 (the trip hood 80 is removed from FIG. 13E to aid viewing of the mechanism). The leading angled side 94 and the angled interior surface 95 of the fixed trip 92 engage the angled, ramp-like surface of the first wall 41*a* of the toggle 74. The corresponding angled surfaces of the toggle 74 and the fixed trip 92 reduce friction as the trip 92 slides over the toggle 74 (i.e., moves up the ramp).

Referring to FIGS. 13D-13F, in embodiments, as the fixed trip 92 slidingly moves pasts the toggle 74, the fixed trip 92 is deflected outwardly, the toggle 74 is deflected inwardly, or both deflections occur (as indicated by the force arrows in FIG. 13F). Generally, the angled interior surface 95 helps initiate outward deflection of the angled side 94 as the fixed trip 92 slides over the toggle 74 so that it can do so without tripping the toggle 74. As noted above, the arcuate member 72 can be configured with coring to permit inward deflection of the toggle 74. The tapered side walls 74*a*, 74*b* and the notches 75 (shown in FIG. 7C), in some embodiments, can also ease the movement of the fixed trip past the toggle and/or facilitate the toggle 74*a* flexing inward at certain positions of the trip 92 sliding over the toggle 74.

As the fixed trip 92 slides against the toggle 74, the fixed trip 92 may, as noted above, deflect radially outward. In some embodiments, the ramp-like first wall 41*a* of the toggle 74, the angled interior surface 95 of the fixed trip 92, and the coring 93 permit the fixed trip 92 to gently flex over the toggle 74 without having to exert too much force on the toggle 74 or the arcuate member 72. Instead, much of the force is absorbed in a distributed manner by the fixed trip 92, including at the upper portion 98*a*. With the force distributed across a large portion of the fixed trip 92, less stress is placed on any one area of the fixed trip 92 (e.g., at the leading edge of the left side 94 of the fixed trip 92) as it deflects outwardly. In this manner, the fixed trip 92 is more robust to withstand repeated sliding on the toggle 74 in full circle mode. This prevents undue wear and tear on the trip lever 70 or particular areas of the fixed trip 92.

To ensure smooth sliding of the fixed trip 92 on the toggle 74 without tripping, the toggle 74 may also be formed of a lubricated material such as a lubricated Acetal material. By one approach, a lubricant can be disposed on the toggle 74 to reduce friction.

By one approach, most of the radial deflection to permit passage of the fixed trip 92 over the toggle 74 is due to the fixed trip 92 deflecting outwardly (as opposed to the toggle 74 and/or arcuate member 72 deflecting inwardly). In such cases, less force needs to be exerted on the toggle 74 from the fixed trip 92. Reducing the amount of inward deflection of the toggle 74 needed for the fixed trip 92 to slide over the toggle 74 advantageously does not require the fixed trip 92 to be too stiff or the trip lever 70 to be too thin or weak (which can lead to breakage). In some cases, it can also help maintain a uniform speed of the fixed trip 92 as it rotates over the toggle (reducing pausing during full circle mode) and reduce wear and tear on the toggle 74 and arcuate member 72.

In some embodiments the distribution of radial deflection of the toggle 74 and the fixed trip 92 may be a certain ratio. For instance, in some embodiments the ratio of outward radial deflection of the fixed trip 92 to the inward radial deflection of the toggle 74 may range from about 50:50 to about 95:5. In a preferred embodiment, the ratio ranges from about 60:40 to about 80:20, preferably 70:30.

By one approach, the toggle 74 may be configured to radially deflect inward a certain distance. For instance, in some embodiments the inward deflection of the toggle may range from about 0.005 in to about 0.025 in, for example about 0.010 in. The fixed trip 92 may also be configured to radially deflect outward a certain distance. For instance, in some embodiments the outward deflection of the fixed trip may range from 0.010 in to about 0.035 in, for example about 0.021 in.

The radial deflection distribution ratio or deflection distances can be adjusted or balanced depending on different design parameters or desiderata, such as the materials of the toggle and trips or the configurations of the toggle and trips (such as the angled surfaces or the amount or position of coring, or the spring capability of the trip lever 70). Another factor is the amount of clearance within the turret or rotor housing. For instance, in designs where there is little radial space or clearance between the turret housing and the fixed trip 92, there may be less room for significant outward radial deflection of the fixed trip 92, thus requiring a configuration that is balanced to enable more inward radial deflection of the toggle 74. In this manner, the movement of the fixed trip past the toggle is not hampered by the turret housing wall. For example, the amount of clearance may require a ratio of outward deflection of the fixed trip 92 to inward deflection of the toggle 74 of 30:70, 50:50, or 60:40. In cases where there is very minimal clearance, the radial deflection may be distributed entirely or substantially entirely to the toggle 74. However, in designs where there is more radial space between the turret housing and the fixed trip 92, the configuration can enable a large proportion of radially outward deflection of the fixed trip 92 relative to the inward deflection of the toggle 74, (for example, 70:30, 80:20, 90:10, 95:5, or even 100:0 if there is sufficient clearance for the fixed trip and, for instance, it is desirable that the toggle 74 not have to be configured to deflect).

The above-described movements of the trips 82, 92 against the toggle 74 prevents the toggle 74 from engaging the trips 82, 92 in a manner that would cause tripping or switching the direction of the arc setting mechanism 10. Thus, there is continuous rotation of the trips 82, 92 and the turret 4 in a single direction. Preferably, the continuous rotation occurs only in the clockwise direction. If the sprinkler 100 is set to counterclockwise rotation when the user activates the full circle mode, the fixed trip 92 will move into contact with the left side 74B of the toggle 74, which causes it to move from stop 52B to stop 52A. This will switch the direction of the rotor sprinkler 100 to clockwise rotation. The rotor sprinkler 100 will then remain in clockwise rotation until a user switches it to part circle mode.

The above embodiments provide several benefits, advantages, and improvements over existing sprinkler technologies. For example, the full circle mode of these embodiments provides a true full circle mode. That is, the sprinkler provides continuous full circle motion in one direction, as opposed to reversing. This provides improved water distribution, allowing every portion of an irrigated terrain area to receive a uniform water distribution, rather than permitting additional watering at the edges of the arc in full circle reversing rotors.

Further, combining the part-circle and true full circle functionality in a single sprinkler eliminates the need for separate rotors to achieve both these functionalities. This helps optimize distribution, stocking, ease of installation and service. It also minimizes line change overs during manufacturing.

Further, the switch from one mode to the other may be made manually by an installer or end user, who may be able to adjust a mode of one or more of a plurality of sprinklers within an irrigation system. In some embodiments, adjustment of the arc setting mechanism may be made by engaging the appropriate components through a cap of the riser, without opening up, taking out, or exchanging components within the rotor sprinkler.

In addition, specific features of the components described above provide an arc setting mechanism that is robust and durable. For instance, the configurations of the toggle 74, arcuate member 72, ring gear 90, and fixed tab 92 facilitate and ease the required radial deflecting of the components and distribute force such that particular portions of the components do not experience too much stress or wear and tear in full circle mode.

Further, configuring the adjustable trip 82 and the fixed trip 92 so that each separately passes over the toggle 74 in full circle mode without any overlapping of the trips 82, 92 allows each trip to flex against the toggle without hampering one another. Any overlapping, for instance, could create rigidity in the area of overlap that can make it more difficult for outward deflecting to occur. Fully separating the adjustable trip 82 and fixed trip 92, and thereby facilitating the outward deflecting of the trips, prevents too much force from being exerted on the toggle 74 and arcuate member 72, which can lead to breakage. The resulting passage of the trips over the toggle 74 is also smooth, without appreciable slowing down or pausing, maintaining a uniform speed of the rotor in full circle mode. This can prevent the terrain which arcuately corresponds to the location of the toggle 74 in full circle mode from being irrigated more heavily than the other areas.

Additionally, the configurations described herein make it unnecessary to redesign or radially enlarge the turret 4 or riser housing so that the trips 82, 92 can be moved out of the way of the toggle 74 to inhibit tripping. As the adjustable trip 82 and fixed trip 92 are each configured to pass the toggle 74 without tripping while still contacting the toggle, no further radial extension of the housing to accommodate full circle mode is needed.

Further, the configurations described herein enable a further "memory arc" function of the rotor sprinkler 100 which can protect against vandals or user mishandling. With such a function, a sprinkler 100 set to part circle mode can automatically return to its set arc of rotation in certain situations in which the set arc has been thrown off course, as illustrated in FIGS. 14A-14F.

Figure 14A:
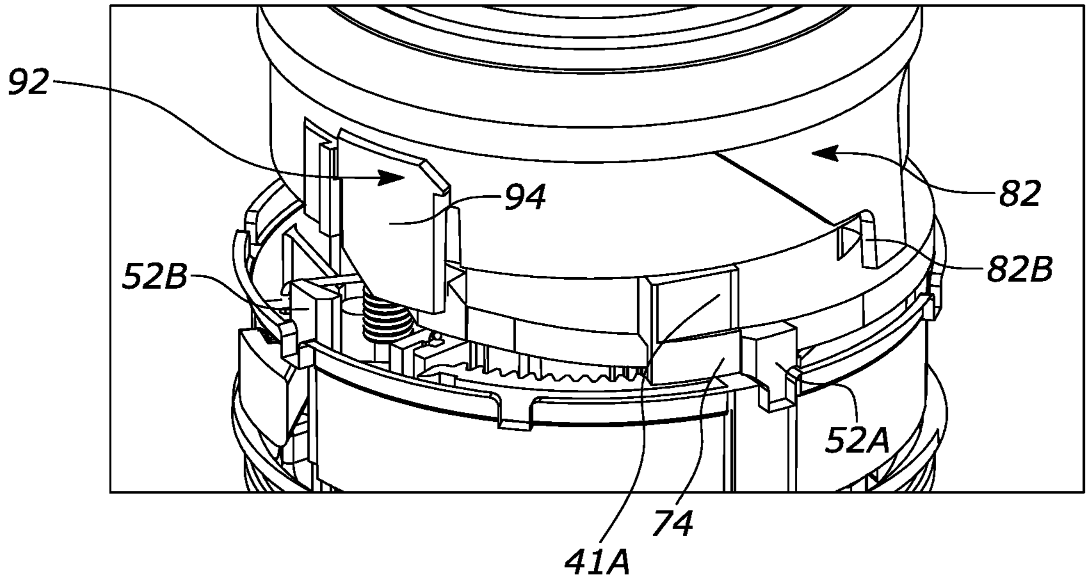
FIG. 14A is a perspective view of the arc setting mechanism of the sprinkler of FIG. 1 in part circle mode in a first position with the toggle between the adjustable tab and the fixed tab for irrigation of a predetermined arc of oscillation.

For instance, with reference to FIG. 14A, an arc setting mechanism 10 of a rotor sprinkler 100 may be set to a particular specified arc in part circle mode, with the adjustable trip 82 adjusted to a position a certain distance away from the position of the fixed trip 92. In some cases, a user may mishandle the turret 4 by rotating the turret to an incorrect configuration described below. The user may, for example, be a vandal intending to disrupt correct operation of the sprinkler 100. However, a user may also inadvertently move the turret into the incorrect configuration.

Figure 14B:
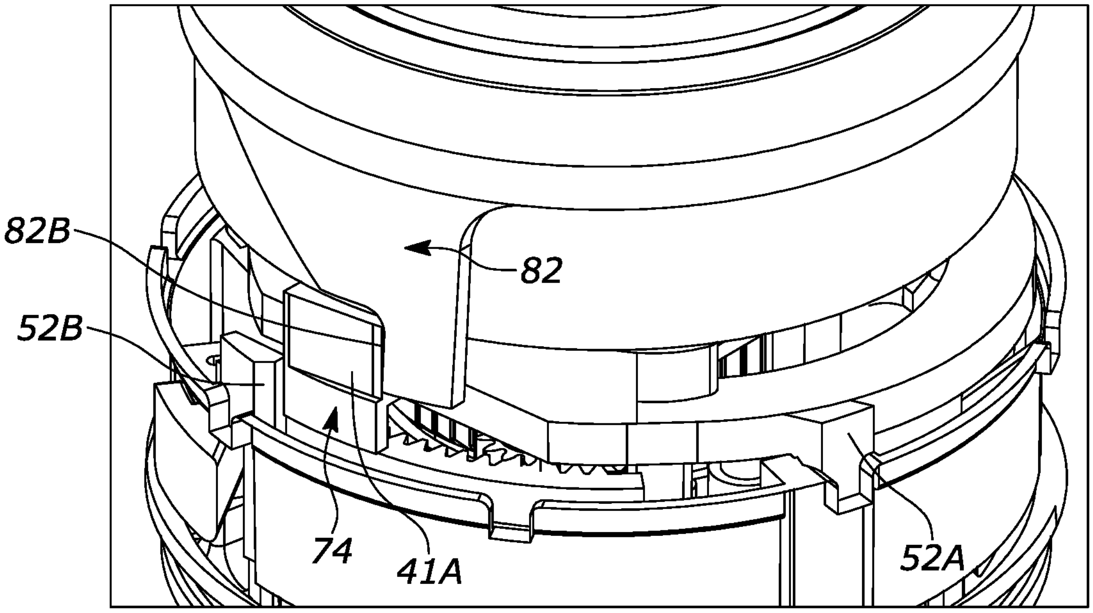
FIG. 14B is a perspective view of the arc setting mechanism of the sprinkler of FIG. 1 in part circle mode in a second position with the adjustable tab adjacent the toggle still between the adjustable tab and the fixed tab for irrigation of the predetermined arc of oscillation.
Figure 14C:
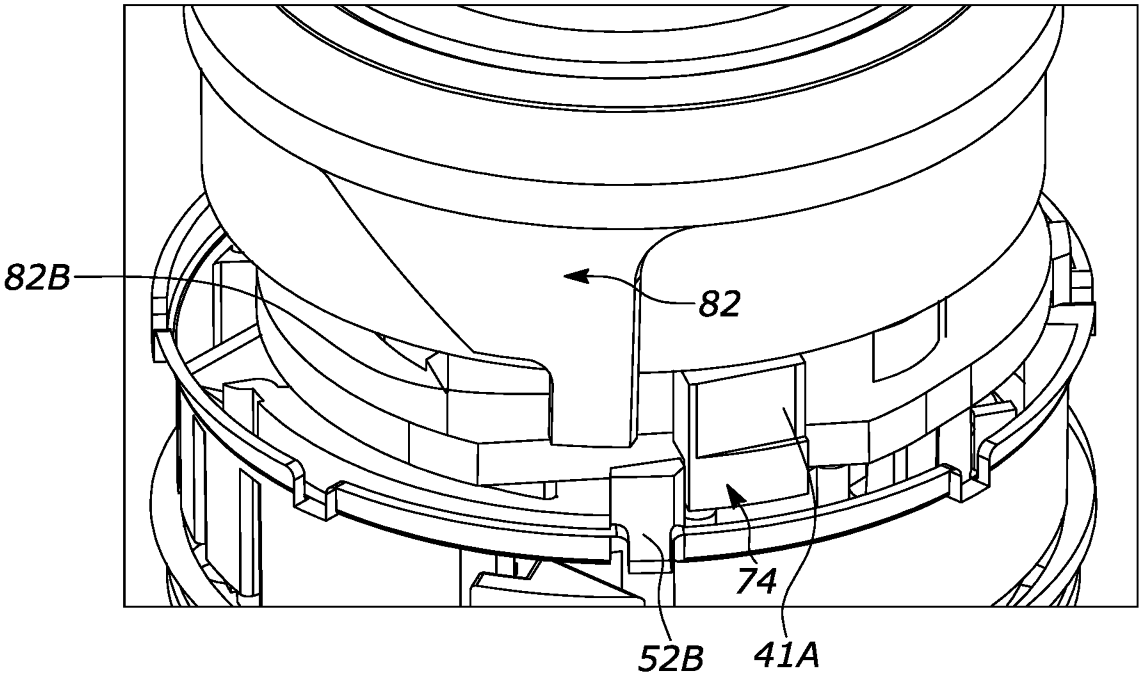
FIG. 14C is a perspective view of the arc setting mechanism of the sprinkler of FIG. 1 in part circle mode in a third position with the adjustable tab forced past the toggle and no longer between the adjustable tab and the fixed tab for irrigation of the predetermined arc of oscillation as shown in FIG. 14A.

With reference to FIGS. 14B and 14C, the user may rotate the turret 4 which rotates a rotor assembly that includes the ring gear 90 and trip hood 80, and the fixed trip 92 and adjustable trip 82 extending respectively therefrom. The rotation can cause the adjustable trip 82 (in this case, moving in a clockwise direction) to be pushed against the toggle 74 causing the trip lever 70 to trip against stop 52*b*. The user may then forcibly rotate the turret 4 so that the adjustable trip 82 is forced past the toggle 74 and stop 52*b* to the other side of the toggle 74 and stop 52*b*. In some embodiments, the tapered side walls 74*a*, 74*b*, and/or the corner notches 75 (illustrated in FIG. 7C) of the toggle 74, as described above, can provide some mitigating protection against this forced thrust of the trip 82 past the toggle 74. For example, one or more of these structures can reduce the torque required by facilitating the forced movement of the adjustable trip 82 over the toggle 74. This can reduce possible wear or breakage of any of the components, lessening the impact of the user mishandling. Specifically, for instance, the side walls 74*a*, 74*b* can be angled (as discussed above) with respect to the sides of the adjustable trip 82 (such as side 82*b*), so that the adjustable trip 82 and side walls 74*a*, 74*b* of the toggle 74 do not "interlock" when the vandal thrusts the adjustable trip 82 past the toggle 74. The angles of the side walls 74*a*, 74*b* can be adjusted so that the torque is high enough so the user or vandal can feel the contact between the adjustable trip 82 and toggle 74 when adjusting the rotor, but low enough that the adjustable trip 82 can be forced past the toggle 74 without damage to one or both components.

When the adjustable trip 82 is forced past the toggle 74, it is now on the wrong side of the toggle 74. That is, the toggle 74 is no longer at the correct distance between the adjustable trip 82 and the fixed trip 92 to enable the reversing mechanism to complete the originally set arc. However, as illustrated in FIGS. 14D-14F, the subsequent movements of the mechanism result in an automatic return to the original arc.

Figure 14D:
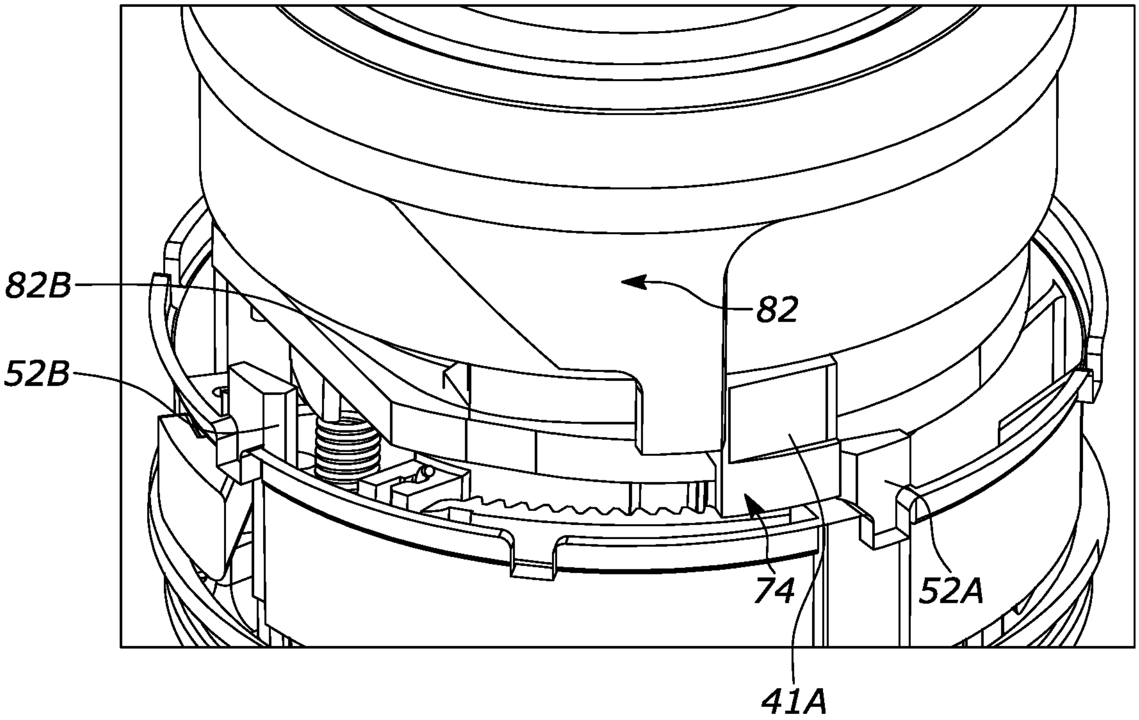
FIG. 14D is a perspective view of the arc setting mechanism of the sprinkler of FIG. 1 in part circle mode in a fourth position with the toggle outside the adjustable tab and the fixed tab for irrigation of the predetermined arc of oscillation as shown in FIG. 14A.

With reference to FIG. 14D, since the trip lever 70 has tripped, the adjustable trip 82 moves in a counterclockwise direction until it trips the toggle 74 against the stop 52*a*. The rotor then moves in a clockwise direction, which results in the fixed trip 92 approaching the toggle 74 in a clockwise direction via its angled left side 94. As described in detail above, the structure of the fixed trip 92 in combination with the structure of the toggle 74 facilitates radial deflection of the fixed trip 92 and/or toggle 74 to enable clockwise passage of the fixed trip 92 over the toggle 74 without tripping. That is, the same features that make it possible for the fixed trip 92 to engage in full circle mode, described above, likewise enable the "memory arc" function.

Figure 14E:
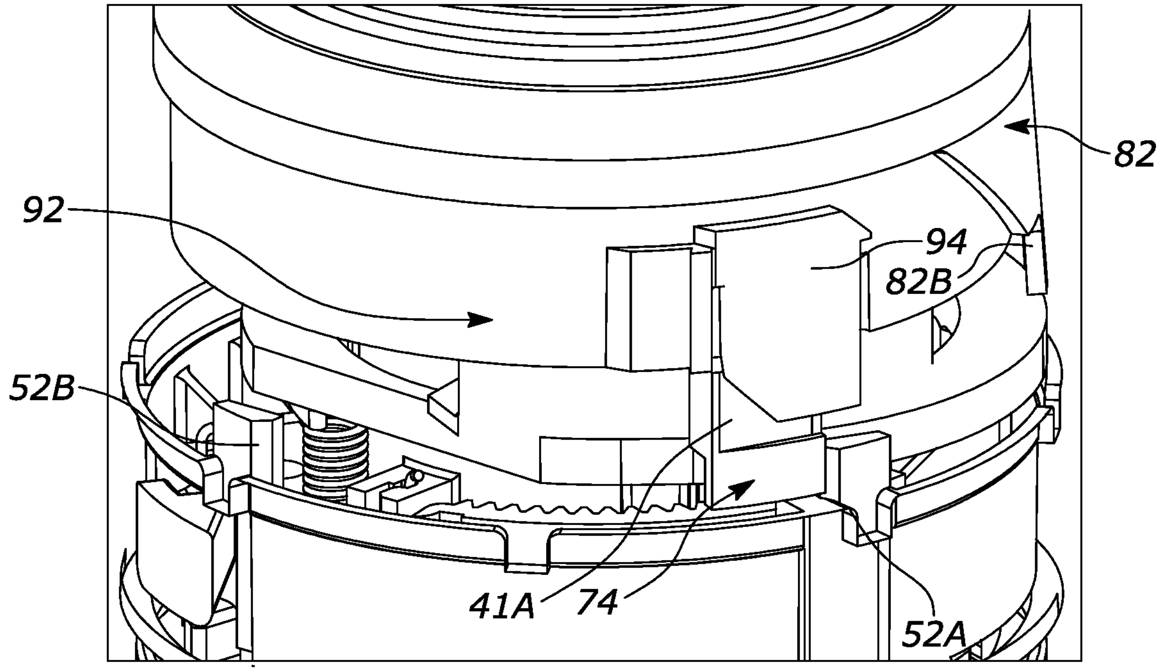
FIG. 14E is a perspective view of the arc setting mechanism of the sprinkler of FIG. 1 in part circle mode in a fifth position with the fixed tab moving automatically over the toggle as it returns to the predetermined arc of oscillation of FIG. 14A.
Figure 14F:
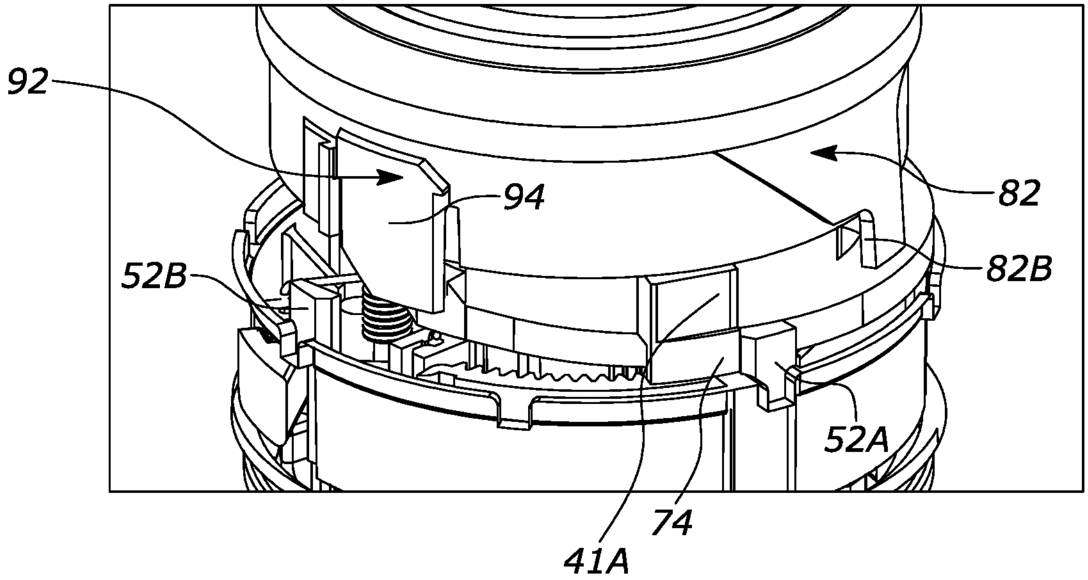
FIG. 14F is a perspective view of the arc setting mechanism of the sprinkler of FIG. 1 in part circle mode in a sixth position, having returned to the predetermined arc of oscillation of FIG. 14A.

As such, in completing the "memory arc", the fixed trip 92 is configured to pass over the toggle 74, as illustrated in FIG. 14E. Upon passing the toggle 74, the toggle 74 is now correctly spaced between the fixed trip 92 and adjustable trip 82 to effect operation according to the originally set arc, as shown in FIG. 14F. That is, clockwise direction will then continue until the adjustable trip 82 causes the toggle 74 to trip on stop 52B, and the subsequent counterclockwise rotation will permit the fixed trip 92 to cause the toggle 74 to trip on stop 52A. In this manner, the trips have returned to their normal reversing operation covering the correct arc, completing the "memory arc".

It will be understood that various changes in the details, materials, and arrangements of parts and components which have been described and illustrated above to explain the nature of the sprinkler may be made by those skilled in the art within the principle and scope of the sprinkler as expressed in the following claims. Furthermore, while various features have been described regarding a particular embodiment or a particular approach, the foregoing description and accompanying drawings is offered by way of illustration only and not as a limitation. Further, while embodiments have been shown and described, it will be apparent to those skilled in the art that modifications may be made to them without departing from the broader aspects of the technological contribution. The actual scope of the protection sought is defined in the following claims.

What is claimed is:

1. A multi-mode irrigation sprinkler, comprising:

a nozzle for dispensing fluid; and an arc setting mechanism that switches between a part circle mode for the nozzle and a full circle mode for the nozzle, the arc setting mechanism comprising:

a fixed tab;

an adjustable tab movable relative to the fixed tab for setting an arc of rotation for the nozzle when in the part circle mode;

a toggle for engaging the fixed tab and the adjustable tab to switch between a first direction and a second direction for the nozzle when in the part circle mode; and the adjustable tab being moveable to deflect at least a portion of the adjustable tab radially outward to set the full circle mode, wherein in the full circle mode the adjustable tab and the fixed tab slide against and over the toggle to allow continuous rotation of the nozzle in one of the first direction and the second direction, wherein in the full circle mode at least one of the toggle deflects radially inward or the fixed tab deflects radially outward as the fixed tab slides against the toggle.

2. The sprinkler of claim 1, wherein in the full circle mode at least both the fixed tab deflects radially outward and the toggle deflects radially inward as the fixed tab slides over the toggle.

3. The sprinkler of claim 1, wherein the fixed tab includes a first side that engages the toggle to switch to the first direction for the nozzle and a second side angled to facilitate the passage of the fixed tab over the toggle in the full circle mode.

4. The sprinkler of claim 3, wherein the fixed tab further includes an angled interior surface adjacent the second side, the toggle includes an inclined surface, and the angled interior surface of the fixed tab facilitates passage of the fixed tab over the inclined surface of the toggle.

5. The sprinkler of claim 1, wherein the arc setting mechanism further comprises a ring portion having an exterior surface, the fixed tab extends from the exterior surface of the ring portion, and a portion of the fixed tab is radially spaced from the ring portion to define a gap therebetween to facilitate the radially outward deflection of the fixed tab in the full circle mode.

6. The sprinkler of claim 5, wherein the fixed tab includes an upper portion aligned with the ring portion and a lower portion that extends below the ring portion and selectively contacts the toggle, and the gap extends between a portion of the upper portion and the ring portion and permits deflection to occur at the upper portion when the fixed tab slides over the toggle in the full circle mode.

7. The sprinkler of claim 1, wherein the arc setting mechanism further comprises a ring portion that includes a projection extending radially outward from the ring portion, and the adjustable tab being moveable onto the projection such that at least a portion of the adjustable tab is deflected radially outward to set the full circle mode.

8. The sprinkler of claim 7, wherein the fixed tab extends radially outward from the ring portion, and a stop extends radially outward from the ring portion between the fixed tab and the projection, the stop inhibiting the adjustable tab from being overlapped with the fixed tab.

9. The sprinkler of claim 1, wherein the toggle includes a first portion and a second portion, wherein the first portion selectively engages the adjustable tab and the fixed tab, and the second portion is disposed at least in part radially outward of the first portion.

10. The sprinkler of claim 9, wherein the first portion includes an inclined surface defining a ramp to facilitate movement of the fixed tab over the toggle in the full circle mode.

11. The sprinkler of claim 9, wherein the first portion of the toggle includes two cut-outs that permit deflection of the toggle radially inward in the full circle mode.

12. The sprinkler of claim 2, wherein the arc setting mechanism further comprises a trip lever, and the toggle being spaced from the trip lever to define a gap therebetween such that the toggle deflects at least in part into the gap to pass by the fixed tab in the full circle mode.

13. An irrigation sprinkler comprising:

a rotatable turret having a nozzle for dispensing fluid;

a set of gears for rotating the turret; and an arc setting mechanism that cooperates with the turret in a part circle mode, the arc setting mechanism comprising:

a toggle, a fixed tab for switching to a first direction for the turret, and an adjustable tab movable relative to the fixed tab for setting a desired arc of rotation for the nozzle when in the part circle mode and for switching to a second direction for the turret, wherein the fixed tab and the adjustable tab selectively engage the toggle to switch between the first direction and second direction when in the part circle mode;

wherein, when in the part circle mode, the arc setting mechanism automatically returns to the desired arc of rotation after the turret is manually rotated until the adjustable tab is forced past the toggle.

14. The sprinkler of claim 13, wherein the arc setting mechanism automatically returns to the desired arc of rotation when the fixed tab slides over the toggle during an operational state of the sprinkler, and wherein at least one of the fixed tab is deflected radially outward and the toggle is deflected radially inward when the fixed tab slides over the toggle.

15. The sprinkler of claim 14, wherein both the fixed tab is deflected radially outward and the toggle is deflected radially inward when the fixed tab slides over the toggle.

16. The sprinkler of claim 14, wherein the fixed tab includes a first side and an angled second side, the first side selectively engaging the toggle to switch directions for the nozzle, and the angled second side able to slidingly pass the toggle to automatically return to the desired arc of rotation.

17. The sprinkler of claim 16, wherein the fixed tab includes an angled interior surface adjacent the angled second side, the toggle includes an inclined surface, and the angled interior surface of the fixed tab facilitates passage of the fixed tab over the inclined surface of the toggle.

18. The sprinkler of claim 13, wherein the toggle includes a first portion and a second portion, the first portion to selectively engage the adjustable tab and the fixed tab, and the second portion being disposed at least in part radially outward of the first portion to engage stops when switching between the first direction and the second direction.

19. The sprinkler of claim 18, wherein the first portion includes an inclined surface that facilitates manual forced movement of the adjustable tab past the toggle to an incorrect arc of rotation and that facilitates an automatic movement of the fixed tab past the toggle to return to the desired arc of rotation during an operational state of the sprinkler.

20. The sprinkler of claim 19, wherein the first portion of the toggle includes two cut-outs that facilitate deflection of the toggle radially inward, the deflection facilitating the manual forced movement of the adjustable tab past the toggle to the incorrect arc of rotation and facilitating the automatic movement of the fixed tab past the toggle to return to the desired arc of rotation during an operational state of the sprinkler.

21. The sprinkler of claim 19, the arc setting mechanism further comprising a trip lever, the toggle being spaced from the trip lever to define a gap therebetween such that the toggle deflects at least in part into the gap to facilitate the forced movement of the adjustable tab past the toggle to the incorrect arc of rotation, and to facilitate the automatic movement of the fixed tab past the toggle to return to the desired arc of rotation during an operational state of the sprinkler.

22. The sprinkler of claim 13, wherein the arc setting mechanism is configured to switch between the part circle mode and a full circle mode, the adjustable tab being moveable to deflect radially outward to set the full circle mode, and in the full circle mode the deflected adjustable tab and the fixed tab are able to slide over the toggle to allow continuous rotation of the turret in one of the first direction and the second direction.

* * * * *